US010793720B2

(12) United States Patent
Puchalski et al.

(10) Patent No.: US 10,793,720 B2
(45) Date of Patent: Oct. 6, 2020

(54) RECLAIMED ASPHALT COMPOSITION AND METHODS OF MAKING AND USING SAME

(71) Applicant: KRATON POLYMERS U.S. LLC, Houston, TX (US)

(72) Inventors: Sebastian Puchalski, Houston, TX (US); Robert Q. Kluttz, Houston, TX (US); Christopher Matthew Lubbers, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 253 days.

(21) Appl. No.: 15/926,495

(22) Filed: Mar. 20, 2018

(65) Prior Publication Data

US 2018/0265704 A1 Sep. 20, 2018

Related U.S. Application Data

(60) Provisional application No. 62/473,766, filed on Mar. 20, 2017.

(51) Int. Cl.
*C08J 11/06* (2006.01)
*C08L 95/00* (2006.01)
(Continued)

(52) U.S. Cl.
CPC .......... *C08L 95/005* (2013.01); *C08G 81/022* (2013.01); *C08J 11/06* (2013.01); (Continued)

(58) Field of Classification Search
None
See application file for complete search history.

(56) References Cited

U.S. PATENT DOCUMENTS 3,231,635 A 1/1966 Holden et al.
3,244,664 A 4/1966 Zelinski et al.
(Continued)

FOREIGN PATENT DOCUMENTS

EP 0413294 A2 2/1991
EP 0387671 B1 11/1993
(Continued)

OTHER PUBLICATIONS

Kandhal et al. "Designing Recycled Hot Mix Asphalt Mixtures Using Superpave Technology" Progress of Superpave (SUperior Performing Asphalt Pavements): Evaluation and Implementation, ASTM STP 1322, R. N. Jester, Ed., American Society for Testing and Materials, 1997, 17 pages. (Year: 1997).*

*Primary Examiner* — Robert S Loewe
(74) *Attorney, Agent, or Firm* — Ramesh Krishnamurti

(57) ABSTRACT

A method of forming a paving composition using reclaimed asphalt pavement (RAP) and/or reclaimed asphalt shingle (RAS) is provided. The method comprises: a) providing a rejuvenated asphalt binder consisting essentially of bitumen, a block copolymer and a bio-oil, wherein the rejuvenated asphalt binder has a rotational viscosity at 135° C. equal to or less than 1000 centipoise, an original G*/sin δ at 64° C. equal to or greater than 1 kPa where G* is the complex shear modulus and δ is the phase angle; a G*/sin δ at 64° C. equal to or greater than 2.2 kPa after aging in a Rolling Thin Film Oven (RTFO); b) providing a virgin asphalt; c) heating the virgin asphalt to 160-200° C.; d) providing a RAP and/or RAS; and e) mixing the heated virgin asphalt, RAP/RAS, and the rejuvenated asphalt binder under conditions suitable to form the paving composition.

20 Claims, 5 Drawing Sheets

(51) Int. Cl.

| | |
|---|---|
| ***C08K 5/09*** | (2006.01) |
| ***C08G 81/02*** | (2006.01) |
| ***C08L 9/06*** | (2006.01) |
| ***C08L 91/00*** | (2006.01) |

(52) U.S. Cl.

CPC .................. *C08K 5/09* (2013.01); *C08L 9/06* (2013.01); *C08L 91/00* (2013.01); *C08L 95/00* (2013.01); *C08J 2395/00* (2013.01); *C08L 2207/22* (2013.01); *C08L 2555/20* (2013.01); *C08L 2555/34* (2013.01); *C08L 2555/52* (2013.01); *C08L 2555/60* (2013.01); *C08L 2555/84* (2013.01)

(56) References Cited

U.S. PATENT DOCUMENTS

| | | | | |
|---|---|---|---|---|
| 3,251,905 | A | 5/1966 | Zelinski | |
| 3,281,383 | A | 10/1966 | Zelinski et al. | |
| 3,390,207 | A | 6/1968 | Moss et al. | |
| 3,594,452 | A | 7/1971 | De La Mare et al. | |
| 3,598,887 | A | 8/1971 | Darcy et al. | |
| 3,692,874 | A | 9/1972 | Farrar et al. | |
| 3,880,954 | A | 4/1975 | Kahle et al. | |
| 3,985,830 | A | 10/1976 | Fetters et al. | |
| 4,076,915 | A | 2/1978 | Trepka | |
| 4,104,332 | A | 8/1978 | Zelinksi | |
| 4,185,042 | A | 1/1980 | Verkouw | |
| 4,219,627 | A | 8/1980 | Halasa et al. | |
| 4,379,891 | A | 4/1983 | Haynes | |
| 5,075,377 | A | 12/1991 | Kawabuchi et al. | |
| 5,272,214 | A | 12/1993 | Custro et al. | |
| 5,681,895 | A | 10/1997 | Bening et al. | |
| 6,150,439 | A * | 11/2000 | Keiichi | C08L 53/02 524/59 |
| 7,256,162 | B2 | 8/2007 | Pollock et al. | |
| 7,560,503 | B2 | 7/2009 | St. Clair et al. | |
| 7,728,074 | B2 | 6/2010 | Kluttz | |
| 7,951,862 | B2 * | 5/2011 | Bloom | C08F 8/04 524/270 |
| 8,133,316 | B2 | 3/2012 | Poncelet | |
| 9,115,296 | B2 | 8/2015 | Kluttz et al. | |
| 9,790,360 | B2 | 10/2017 | Puchalski et al. | |
| 2003/0212168 | A1 * | 11/2003 | White | C08L 95/00 524/59 |
| 2010/0275817 | A1 * | 11/2010 | Williams | C04B 24/08 106/671 |
| 2011/0294927 | A1 * | 12/2011 | Williams | C08L 95/00 524/59 |
| 2013/0319289 | A1 * | 12/2013 | Nevin | C08L 95/00 106/281.1 |
| 2015/0252534 | A1 * | 9/2015 | Dempsey | E01C 7/18 404/17 |
| 2017/0247542 | A1 * | 8/2017 | Williams | E01C 7/22 |

FOREIGN PATENT DOCUMENTS

| | | |
|---|---|---|
| EP | 0636654 B1 | 10/1997 |
| WO | 94/22931 | 10/1994 |

* cited by examiner

RECLAIMED ASPHALT COMPOSITION AND METHODS OF MAKING AND USING SAME

RELATED APPLICATIONS

This application claims priority from U.S. Provisional Application No. 62/473,766, having a filing date of Mar. 20, 2017, the disclosure of which is incorporated herein by reference.

TECHNICAL FIELD

The present disclosure relates to recycled asphalt mixes.

BACKGROUND

U.S. Pat. No. 7,728,074, incorporated by reference, discloses a block copolymer for uniformly mixing with a bitumen binder for hot mix asphalt paving applications. The block copolymer is a mixture of a diblock and triblock styrenic block copolymer where the diblock to triblock ratio is greater than 1:1. U.S. Pat. No. 8,133,316 describes a process for mixing reclaimed asphalt pavement (RAP) with virgin asphalt composition. The heated RAP is mixed with mineral or vegetable oil such as rape seed or palm oil, or an animal oil, up to 10 wt. %. Thereafter it is mixed with the virgin asphalt composition (asphalt and gravel/sand). Compositions that rejuvenate RAP typically contain from 20 wt. % to 30 wt. % of reclaimed asphalt. No bio-based oil, nor styrenic block copolymer is disclosed. U.S. Pat. No. 7,560, 503 discloses a gel made from a blend of 1 part styrenic block copolymer and 3 to 20 parts oil. The styrenic block copolymer can be a combination of a high vinyl diblock and a high vinyl triblock copolymer. U.S. Pat. No. 9,115,296, is hereby incorporated by reference, relates to bituminous emulsions. The styrenic block copolymer is a mixture of a diblock and triblock styrenic block copolymer where the diblock to triblock ratio is greater than 1:1. U.S. Pat. No. 9,790,360 discloses a bio-oil gel composition containing an antioxidant system for blending with RAP and fresh asphalt (bitumen).

There exists a need for novel compositions that can be conveniently incorporated into RAP forming top concrete pavement layers while maintaining adequate performance properties.

SUMMARY

Figure 1:
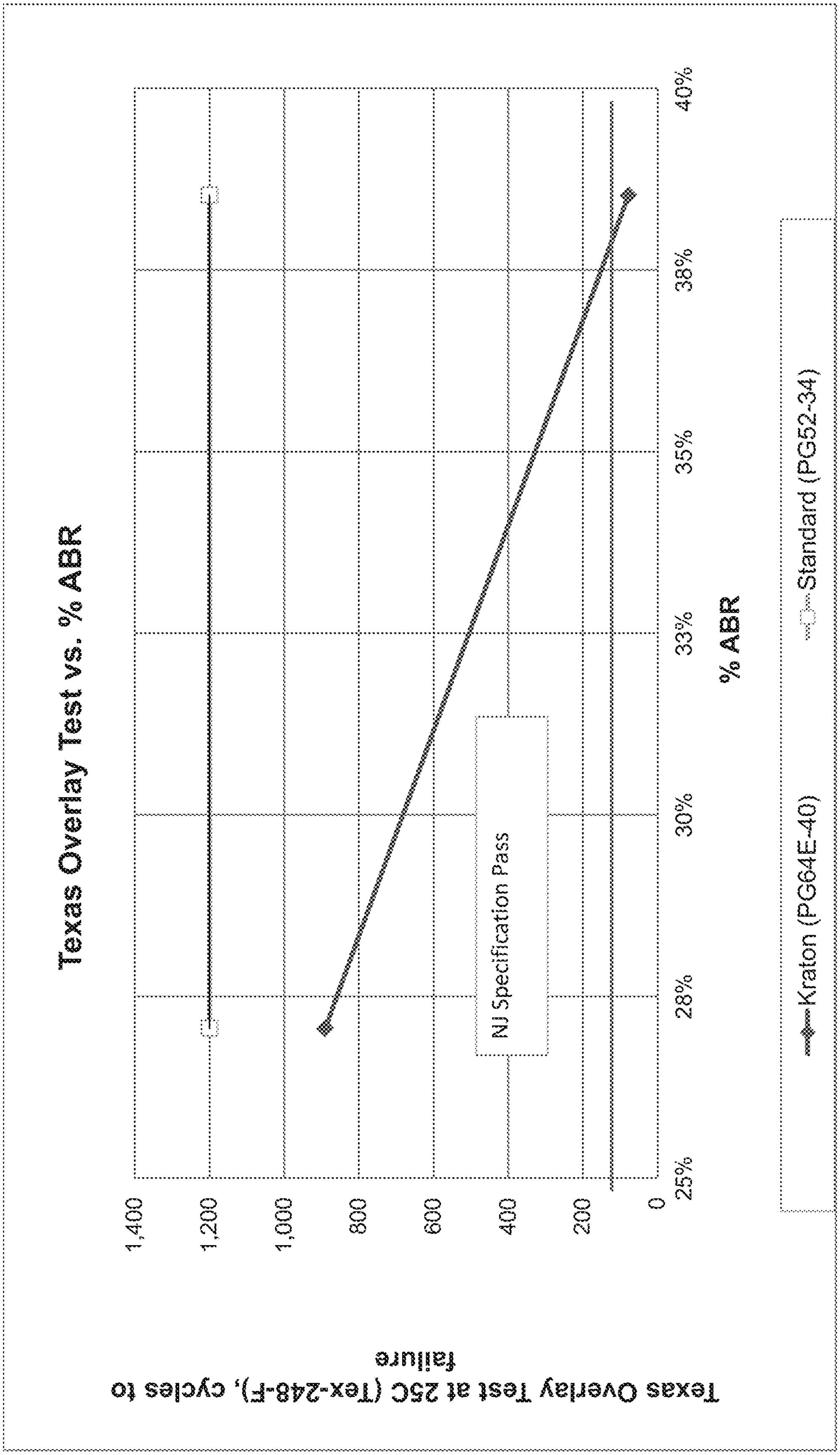
FIG. 1 is a plot of the results of a Texas overlay test carried out on the samples of example 1.

In one aspect, a method of forming a paving composition using reclaimed asphalt pavement (RAP) and/or reclaimed asphalt shingle (RAS) is provided. The method comprises: a) providing a rejuvenated asphalt binder consisting essentially of bitumen, a block copolymer composition and a bio-oil, wherein: the rejuvenated asphalt binder has a rotational viscosity at 135° C. of equal to or less than about 1000 centipoise; the rejuvenated asphalt binder has an original G*/sin δ at 64° C. of equal to or greater than about 1 kPa where G* is the complex shear modulus and δ is the phase angle; and the rejuvenated binder has a G*/sin δ at 64° C. of equal to or greater than about 2.2 kPa after aging in a Rolling Thin Film Oven (RTFO); b) providing a virgin asphalt; c) heating the virgin asphalt to a temperature from about 160° C. to about 200° C.; d) providing a reclaimed asphalt pavement (RAP); and e) mixing the heated virgin asphalt, RAP, and the rejuvenated asphalt binder under conditions suitable for the formation of the paving composition. In one embodiment, the mixture is heated to a temperature from about 160° C. to about 200° C. to form the paving composition.

In another aspect, a rejuvenated asphalt binder for use in forming a paving composition containing RAP and/or RAS is provided. The binder composition consists essentially of bitumen, a block copolymer composition and a bio-oil, wherein: the rejuvenated asphalt binder has a rotational viscosity at 135° C. of equal to or less than about 1000 centipoise; the rejuvenated asphalt binder has an original G*/sin δ at 64° C. of equal to or greater than about 1 kPa where G* is the complex shear modulus and δ is the phase angle; and the rejuvenated binder has a G*/sin δ at 64° C. of equal to or greater than about 2.2 kPa after aging in a Rolling Thin Film Oven (RTFO), wherein the rejuvenated asphalt binder is formed by mixing bitumen with a block copolymer and a bio-oil, in a ratio of block copolymer to bio-oil ranging from 1:7 to 3:1.

DETAILED DESCRIPTION

Unless defined otherwise, all technical and scientific terms used herein have the same meanings as commonly understood by one of skill in the art to which the disclosed disclosure belongs. The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects of the disclosure and are also disclosed.

Disclosed herein are compositions and methods for the recycling of reclaimed asphalt pavement (RAP). Reclaimed asphalt pavement (RAP) is the term given to removed and/or reprocessed pavement materials containing asphalt and aggregates. These materials are generated when asphalt pavements are removed for reconstruction, resurfacing, or to obtain access to buried utilities. When properly crushed and screened, RAP consists of high-quality, well-graded aggregates coated by asphalt cement.

A composition of the type disclosed herein for the recycling of RAP is termed a composition for asphalt recycling (CAR). A CAR of the type disclosed herein may comprise (1) a rejuvenated asphalt binder, (2) virgin aggregate, and (3) reclaimed asphalt pavement. Both the CAR and methods of using same are described in more detail later herein.

The following terms are used throughout the present disclosure:

RAP=reclaimed asphalt pavement
RTFO=rolling thin film oven
DSR=dynamic shear rheometer
PAV=pressure aging vessel % Recovery refers to the value obtained from AASHTO T350 test. % recovery characterizes elasticity of asphalt binder. High % recovery is characteristic of asphalt binder samples modified with an elastomeric modifier such as SBS.

Delta Critical temperature ($T_{cr}$) is an indicator of thermal cracking. Thermal cracking is widely recognized as a major cause of distress in asphalt pavements located in colder temperature climates such as those found in North America. For a given pavement, delta critical temperature of the asphalt binder used is considered to be a good indicator of the low temperature cracking resistance of the whole pavement. Unless specifically stated otherwise, all technical terms used herein have the meaning as commonly understood by those skilled in the art.

When referring to a block copolymer herein, or to a polymer thereof, it is to be understood that properties such as the molecular weight or the specific amount(s) of the polymer units which are present are not absolute values but rather may vary from polymer strand to polymer strand, or from one polymer block A to the corresponding polymer block A, within certain limits. For simplicity of discussion herein, the block copolymer itself may be referred to herein in the singular, but when referring to "average" it would be understood by those of skill in the art that in actual real world conditions, the block copolymer exists in a multitude of strands forming a polymer composition.

"Polymer" refers to polymer chain which is formed by, and corresponds to, the indicated monomer.

"% wt." as used herein refers to the number of parts by weight of monomer per 100 parts by weight of polymer on a dry weight basis, or the number of parts by weight of ingredient per 100 parts by weight of specified composition.

"Molecular weights" refers to the true molecular weight in g/mol of the polymer or block of the copolymer. The molecular weights can be measured with gel permeation chromatography (GPC) using polystyrene calibration standards, such as is done according to ASTM 3536. GPC is a method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used may be a combination ultraviolet and refractive index detector. The molecular weights expressed herein are measured at the peak of the GPC trace, converted to true molecular weights, and are commonly referred to as "peak molecular weights."

Number average molecular weights may be determined by light scattering measurements, and are expressed as number average molecular weight in g/mol.

"Melt index" refers to a measure of the melt flow of the polymer according to ASTM D 1238, under condition G at 200° C. at 5 kg load, expressed in units of grams of polymer melt passing through an orifice in 10 minutes.

AASHTO M320-10 (2015) Performance-Graded Asphalt Binder is method which allows for better characterization of the performance-related properties of an asphalt binder in accordance to specified performance graded binder requirements. This method specifies tests included in AASTHTO T315, T240-13 and T316-16.

American Association of State Highway and Transportation Officials (AASHTO) T 315 Determining the Rheological Properties of Asphalt Binder Using a Dynamic Shear Rheometer (DSR) procedure, also termed the AASHTO DSR test. The AASHTO DSR test utilizes a small sample of asphalt binder that is sandwiched between two plates. The test temperature, specimen size and plate diameter depend upon the type of asphalt binder being tested. Unaged asphalt binder and rolling thin oven film residue are tested at the high temperature specification for a given performance grade (PG) binder using a specimen 0.04 inches (1 mm) thick and 1 inch (25 mm) in diameter. The test specimen is kept at near constant temperature by heating and cooling a surrounding environmental chamber. The top plate oscillates at 10 rad/sec (1.59 Hz) in a sinusoidal waveform while the equipment measures the maximum applied stress, the resulting maximum strain, and the time lag between them. The software then automatically calculates the complex modulus (G*) and phase angle (6).

AASHTO Rolling Thin Film Oven (RTFO) Test simulates the short-term aging of asphalt binders that occurs during the hot-mixing process. This test is used to calculate the change in sample mass on heating, but its main function is to produce an aged material for analysis by other suitable means.

AASHTO R 28: Accelerated Aging of Asphalt Binder Using a Pressurized Aging Vessel (PAV) test. The Pressure Aging Vessel (PAV) was used to simulate long term aged asphalt binder for physical property testing. Asphalt binder was exposed to heat and pressure to simulate in-service aging over a 7 to 10 year period. The basic PAV procedure takes rolling thin film oven aged asphalt binder samples, places them in stainless steel pans and then ages them for 20 hours in a heated vessel pressurized to 305 psi (2.10 MPa or 20.7 atmospheres). Samples are then stored for use in physical property tests.

AASHTO M332-14 Performance Graded Asphalt Binder Using Multiple Stress Creep Recovery (MSCR) This specification covers asphalt binders graded by performance using the multiple stress creep recovery (MSCR) test. Grading designations are related to the average seven-day maximum pavement design temperature, and traffic loading.

AASHTO T350-14 Multiple Stress Creep Recovery (MSCR) test provides the user with a new high temperature binder specification that indicates the rutting performance of the asphalt binder and is blind to modification. The MSCR test uses the well-established creep and recovery test concept to evaluate the binder's potential for permanent deformation. Using the Dynamic Shear Rheometer (DSR) a one-second creep load is applied to the asphalt binder sample. After the 1 second load is removed, the sample is allowed to recover for 9 seconds. The test is started with the application of a low stress (0.1 kPa) for 20 creep/recovery cycles then the stress in increased to 3.2 kPa and applied for 10 creep/recovery cycles.

The various tests, e.g., AASHTO Brookfield test (also termed the AASHTO T 316) use a rotational viscometer (RV) to determine the viscosity of asphalt binders in the high temperature range of manufacturing and construction. The RV test can be conducted at various temperatures, but since manufacturing and construction temperatures are fairly similar regardless of the environment, the test for Superpave PG asphalt binder specification is conducted at 275° F. (135° C.). The basic RV test measures the torque required to maintain a constant rotational speed (20 RPM) of a cylindrical spindle while submerged in an asphalt binder at a constant temperature. This torque is then converted to a viscosity and displayed automatically by the RV.

Texas Overlay Test (Tex-248-F) or Texas Overlay Test at 25 C (Tex-248-F), cycles-to-failure determines the susceptibility of bituminous mixtures to fatigue or reflective cracking. The overlayer device used in the test is a computer-controlled electro-hydraulic system that applies repeated direct tension loads to HMA specimens. The machine features two steel blocks, one is fixed and the other slides horizontally. The sliding block applies tension in a cyclic triangular waveform to a constant maximum displacement of 0.025 inches. The sliding block reaches the maximum displacement and then returns to its initial position in 10 seconds. Testing is performed at a constant temperature of 77±3° F. This test method measures the number of cycles to failure. The device automatically measures and records load, displacement, and temperature every 0.1 seconds characterizes both crack initiation and crack propagation properties of asphalt mixtures.

The Hamburg Wheel Tracking Device Test (AASHTO T324) 50° C. (AASHTO T324) method describes the testing of submerged, compacted hot melt asphalt (HMA) in a reciprocating rolling-wheel device. This test method measures the rut depth and number of passes to failure. A laboratory-compacted specimen of HMA, a saw-cut slab specimen, or a core taken from a compacted pavement, is repetitively loaded using a reciprocating steel wheel. The specimen is submerged in a temperature-controlled water bath of 40° C. to 50° C. (104° F. to 122° F.) or a temperature specified for the binder being used.

AASHTO T 321—Determining the Fatigue Life of Compacted Hot-Mix Asphalt (HMA) Subjected to Repeated Flexural Bending is also termed the flexural fatigue test, used to characterize the fatigue life of HMA at intermediate pavement operating temperatures. The basic flexural fatigue test subjects a HMA beam to repeated flexural bending in a controlled atmosphere. In order to relate laboratory results to normally observed field performance, a shift factor of 10 to 20 is typically used.

Standard Test Method for Determining Fracture Energy of Asphalt-Aggregate Mixtures Using the Disk-Shaped Compact Tension Geometry: This test method was developed for determining the fracture resistance of asphalt-aggregate mixtures. The method is generally valid for specimens that are tested at temperatures of 10° C. (50° F.) or below. The specimen geometry is readily adapted to 150 mm diameter specimens, such as fabricated from Superpave (trademark) gyratory compactors (Test Method D6925), that are used for the asphalt concrete design process. The specimen geometry can also be adapted for forensic investigations using field cores of pavements where thin lifts are present. This geometry has been found to produce satisfactory results for asphalt mixtures with nominal maximum aggregates size ranging from 4.75 to 19 mm.

Determining the Fracture Energy of Asphalt Mixtures Using the Semi Circular Bend Geometry (SCB). This test method covers the determination of the fracture energy (Gf) of asphalt mixtures by means of the semi-circular bend geometry (SCB). The method also includes procedures for calculating fracture toughness ($K_{IC}$) and stiffness (S). The SCB specimen is a half disc with a notch that is arm long and makes an angle $\alpha$ with the vertical axis of the disc.

Asphalt is defined by the ASTM as a dark brown to black cement-like material in which the predominant constituents are bitumens that occur in nature or are obtained in petroleum processing. Asphalts characteristically contain saturates, aromatics, resins and asphaltenes. The terms "asphalt" and "bitumen" are often used interchangeably to mean both natural and manufactured forms of the material, which are all within the scope of the compositions and methods contemplated and described herein.

In an aspect of the present disclosure, a composition for asphalt recycling (CAR) comprises a rejuvenated asphalt binder, also termed a rejuvenated bitumen precursor composition. The rejuvenated asphalt binder may consist essentially of: (i) an asphalt binder, (ii) a bio-oil, (iii) a styrenic block copolymer, and optionally (iv) elemental sulfur.

Asphalt binder: In an aspect, the rejuvenated asphalt binder comprises an asphalt binder. Herein an asphalt binder refers to a tarlike mixture of hydrocarbons derived from petroleum naturally or by distillation and used primarily for road surfacing and roofing. Asphalt binder may be used interchangeably with bitumen. The type of asphalt suitable for use may include any naturally occurring, synthetically manufactured and modified asphalts known now or in the future. Naturally occurring asphalt is inclusive of native rock asphalt, lake asphalt, and the like. Synthetically manufactured asphalt is often a byproduct of petroleum refining operations, including air-blown asphalt, blended asphalt, cracked or residual asphalt, petroleum asphalt, propane asphalt, straight-run asphalt, thermal asphalt, and the like.

In an aspect, the asphalt binder is present in the rejuvenated asphalt binder in an amount of from about 75.5 weight percent (wt. %) to about 83.25 wt. %, alternatively from about 78 wt. % to about 83.5 wt. %, or alternatively from about 80.5 wt. % to about 83.5 wt. % based on the weight of the rejuvenated asphalt binder.

Rejuvenator—bio-oil: In an aspect, the rejuvenated asphalt binder comprises a bio-oil, alternatively a bio-oil. Herein a bio-oil refers to an oleaginous material derived from a renewable resource. In an aspect, the rejuvenated asphalt binder comprises a bio-oil such as those produced from fast pyrolysis process of biomass that provides a source of lignin-derived oligomers. One route to convert lignocellulosic biomass to produce chemicals and fuels that has gained serious attention more recently is a fast pyrolysis platform. Fast pyrolysis is the rapid thermal decomposition of organic compounds in the absence of oxygen to produce liquids, gases, and chars. The distribution of products depends on the biomass composition, particle size, and rate and duration of heating. Liquid yields as high as 78% are possible. Depending on its original lignocellulosic biomass source, bio-oil contains between 10 to 30% lignin-derived oligomers by weight.

In yet another aspect, the oil, or the bio-oil may be obtained from a lecithin-containing material derived from a crude plant-based oil refining stream. The lecithin-containing material may be gums resulting from a degumming processes carried out on crude plant-based oils, for example, but not limited to, water degumming, caustic and acidic degumming, phospholipase A and phospholipase C degumming, or other anzymatically produced gums. In other aspects, the lecithin-containing material may come from other oils or other crude triacylglyceride (i.e. oil) refining streams containing fatty acids and/or phosphatide material (e.g., soapstock, acidulated soapstock, and so on). Lecithin-containing material may come from animal sources, such as egg yolks. In some aspects, lecithin-containing material may comprise water, phosphatides, free fatty acids, and oil wherein the oil is primarily triacylglycerides with some diacylglycerides and monoacylglycerides. In other aspects, the lecithin-containing material may be added to fatty acid sources such as, for example, recovered corn oil, acid oil, and other compatible oils. In an aspect, the lecithin fatty acid blend may be mixed with an asphalt binder and/or aggregate. The lecithin fatty acid blend may be further used to treat reclaimed asphalt pavement (RAP).

Other examples of bio-based oils suitable for use in the present disclosure include without limitation linseed oil, olive oil, peanut oil, corn oil, palm oil, or canola oil, or soybean bio-oil, or tall oil. In an aspect the bio-oil is linseed oil (otherwise known as flaxseed oil) or linseed oil blends that are at least about 90 wt. % linseed oil, alternatively about 95 wt. % linseed oil, and up to about 5 wt. % to about 10 wt. % other oil(s) based on the total weight of the oil. For purposes of clarity, linseed oil has more than 50 wt. % of said omega 3 fatty acid and with about 10 wt. % to about 20 wt. % each omega 6 and omega 9 fatty acids. Linseed oil is understood to contain about 6 wt. % to about 9 wt. % saturated fatty acids, about 10 wt. % to about 22 wt. % mono-saturated fatty acids, about 68 wt. % to about 89 wt. % polyunsaturated fatty acids, wherein about 56 wt. % to about 71 wt. % are omega 3 fatty acids, about 12 wt. % to about 18 wt. % are omega 6 fatty acids, and about 10 wt. % to about 22 wt. % are omega 9 fatty acids. Linseed oil has a flash point that ranges from 300° C. to 320° C. In an aspect, the bio-oil is a blend of linseed oil and one or more other bio-based oils, such as olive oil, peanut oil, corn oil, palm oil, or canola oil, or soybean bio-oil, or tall oil. In aspects wherein the bio-oil is a blend of oils such blends may be characterized by flash point of greater than about 230° C.

In an aspect, a bio-oil suitable for use in the present disclosure comprises principally functionalities derived from carboxylic acids (including resin acids) or $C_8$-$C_{20}$ fatty acids and $C_1$-$C_{18}$ alcohols. The acid portion can be linear, branched, cyclic, aromatic, or a combination thereof; it can be saturated, unsaturated, or a combination thereof.

$C_8$-$C_{20}$ fatty acids from which the bio-oil may include without limitation benzoic acid, caprylic acid, azeleic acid, ricinoleic acid 12-hydroxystearic acid, stearic acid, isostearic acid, tall oil fatty acid, oleic acid, linoleic acid, linolenic acid, palmitic acid, Monomer acid dimer acids, tall oil heads, and the like, and mixtures thereof.

The alcohol portion of the bio-oil can be derived from primary, secondary, or tertiary alcohols; such as a monol, diol, or polyol. The alcohol portion of the bio-oil can also derive from polyethers such as triethylene glycol, polyethylene glycol or phenolate esters. $C_1$-$C_{18}$ alcohols from which the bio-oils of the present disclosure may derive include without limitation methanol, ethanol, 1-propanol, isobutyl alcohol, 2-ethylhexanol, octanol, isodecyl alcohol, benzyl alcohol, cyclohexanol, ethylene glycol monobutyl ether, ethylene glycol, propylene glycol, diethylene glycol, triethylene glycol, neopentyl glycol, glycerol, trimethylolpropane, pentaerythritol, sorbitol, sucrose, and the like, and mixtures thereof. In an aspect, the alcohol functionality of the bio-oil is derived from an "improved thermal stability alcohols," having a quaternary carbon located beta to the oxygen of any of its hydroxyl groups. Nonlimiting examples of improved thermal stability alcohols include trimethylolpropane, neopentyl glycol, trimethylolethane, pentaerythritol, dipen-taerythritol, benzylic alcohols, and the like.

Resin acids from which the bio-oil may derive include monocarboxylic acids in the form $C_{19}H_{29}COOH$ with a nucleus of three fused six-carbon rings, and comprising double bonds that vary in number and location. Examples of resin acids from which the bio-oil may derive include without limitation abietic, neoabietic, dehydroabietic, pimaric, levopimaric, sandaracopimaric, isopimaric, and palustric acids. Since many resin acids are solids, resin acids may be blended with fatty acids, or selected so that they have relatively low softening points to provide bio-oils suitable for use in the present disclosure.

In an aspect, the bio-oil derives from tall oil fatty acid (TOFA) or a TOFA derivative (e.g., a TOFA dimer acid). Tall oil fatty acid is isolated from crude tall oil (CTO) by distillation. The CTO is a by-product of the Kraft wood pulping process. Distillation of CTO gives, in addition to tall oil fatty acid, a more volatile, highly saturated fraction of long-chain fatty acids (largely palmitic acid), known as "tall oil heads." Tall oil fatty acid is the next cut, which contains mostly $C_{18}$ and $C_{20}$ fatty acids having varying degrees of unsaturation (e.g., oleic acid, linoleic acid, linolenic acid, and various isomers of these). Another cut, known as distilled tall oil or "DTO," is a mixture of mostly tall oil fatty acid and a smaller proportion of tall oil rosin. Tall oil rosin ("TOR"), isolated next, consists largely of a $C_{19}$-$C_{20}$ tricyclic monocarboxylic acid. The bottom cut of the distillation is known as "tall oil pitch" or simply "pitch." Generally, any cut that contains at least some tall oil fatty acid may be suitable for use in making a bio-oil.

Polymerized fatty acids can be used to make the bio-oils. Because of its high content of unsaturated fatty acids, TOFA is commonly polymerized using acid clay catalysts. In this high-temperature process, the unsaturated fatty acids undergo intermolecular addition reactions by, e.g., the "ene reaction," to form polymerized fatty acids. The mechanism is complex and not well understood. However, the product comprises mostly dimerized fatty acid and a unique mixture of monomeric fatty acids. Distillation provides a fraction highly enriched in dimerized fatty acid, which is commonly known as "dimer acid." Such dimer acids are suitable for use in making the bio-oils of the present disclosure.

Distillation of polymerized TOFA also provides a fraction that is highly enriched in monomeric fatty acids and is known as "Monomer" (with a capital "M") or "Monomer acid." Monomer, a unique composition, is a suitable starting material for making bio-oils. Whereas natural source-derived TOFA largely consists of linear $C_{18}$ unsaturated carboxylic acids, principally oleic and linoleic acids, The monomer contains relatively small amounts of oleic and linoleic acids, and instead contains significant amounts of branched and cyclic $C_{18}$ acids, saturated and unsaturated, as well as elaidic acid. The more diverse and significantly branched composition of Monomer results from the catalytic processing carried out on TOFA during polymerization. One of ordinary skill in the art will readily understand that the reaction of Monomer with alcohols to make "monomerate" esters will yield unique derivatives that differ from the corresponding TOFA-based esters. Monomer as disclosed herein has been assigned CAS Registry Number 68955-98-6. Examples of Monomer products are Century™ M05 and M06 fatty acids, products of Arizona Chemical Company. For more information about the composition of Monomer and its conversion to various esters, see U.S. Pat. No. 7,256,162 the teachings of which are incorporated herein by reference.

Other nonlimiting examples of bio-oils suitable for use in the present disclosure include, for example, ethylene glycol tallate (i.e., ethylene glycol ester of tall oil fatty acid), propylene glycol tallate, trimethylolpropane tallate, neopentyl glycol tallate, methyl tallate, ethyl tallate, glycerol tallate, oleyl tallate, octyl tallate, benzyl tallate, 2-ethylhexyl tallate, polyethylene glycol tallates, tall oil pitch esters, ethylene glycol monomerate, glycerol monomerate, trimethylolpropane, monomerate, neopentyl glycol monomerate, 2-ethylhexyl monomerate, ethylene glycol dimerate, 2-ethylhexyl dimerate, 2-ethylhexyl trimerate, trimethylolpropane isostearate, benzyl 12-hydroxystearate, benzyl ricinoleate, octyl caprylate, octyl azelate, octyl benzoate or combinations thereof. In an aspect, the bio-oil comprises tallate. In yet another aspect, the bio-oil comprises monomerates, alternatively trimethylolpropane tallate, ethylene glycol monomerate, glycerol monomerate or combinations thereof.

In an aspect, a bio-oil suitable for use in the present disclosure has a cyclic content of equal to or greater than about 5 wt. % or alternatively equal to or greater than about 10 wt. %. In certain aspects, the bio-oil has a cyclic content of from about 5 wt. % to about 95 wt. % or alternatively from about 10 wt. % to about 90 wt. %. Herein "cyclic content," refers to the percentage by weight of compounds in the bio-oil that have one or more cycloaliphatic or aromatic rings as part of the structure. Thus, the cyclic content can come from mono-, bi-, tri-, or other polycyclic compounds. The rings can be fused or isolated. The rings can be 3-, 4-, 5-, 6-, or 7-membered or alternatively 5- or 6-membered rings. The rings may also contain one or more heteroatoms, e.g., oxygen, nitrogen, sulfur, or the like.

In an aspect, the bio-oil comprises an ester or ester blend derived from an acid selected from the group consisting of aromatic acids, fatty acids, fatty acid monomers, fatty acid dimers, fatty acid trimers, rosin acids, rosin acid dimers, and mixtures thereof.

In some aspects, the bio-oil comprises an ester derived from one or more aromatic acids. Nonlimiting examples of esters of aromatic acids suitable for use in the present disclosure include phthalates, isophthalates, terephthalates, benzoates, alkylated benzoates, naphthoates, anthroates, phenanthroates, and the like. Specific examples include dimethyl phthalate, dioctyl phthalate, dimethyl isophthalate, dimethyl terephthalate, dibenzyl phthalate, oleyl benzoate, and the like, and mixtures thereof.

In some aspects, the bio-oil comprises an ester derived from one or more fatty acids. Nonlimiting examples of fatty acid esters suitable for use in the present disclosure include esters of acids that are saturated or unsaturated, linear or branched, and comprise 6 to 40, alternatively 8 to 30, or alternatively 8 to 20 carbon atoms. In an aspect, the fatty acid esters derive from $C_1$-$C_{18}$ alcohols and may derive from triglycerides such as natural oils. In an aspect, the fatty acid esters comprise caprates, caprylates, azelates, ricinoleates, 12-hydroxystearates, isostearates, stearates, laurates, myristates, oleates, palmitates, linolates, linolenates, or combinations thereof. Because the fatty esters usually do not have cyclic content, they are may be combined with other materials that have cyclic content, such as rosin esters.

In an aspect, the bio-oil has a flash point greater than about 200° C., alternatively greater than about 220° C., or alternatively greater than about 250° C. The bio-oils may be noncrystalline, and characterized by a melting point or titer at or below about 30° C., alternatively below about 20° C. or alternatively below about 0° C. In another aspect, the bio-oil is characterized by a cloud point below about 0° C., alternatively below about −10° C., alternatively below about −20° C. or alternatively below about −25° C. Cloud point is found by cooling a neat, molten sample gradually and observing the temperature at which the clear sample just becomes hazy.

In an aspect, the bio-oil is present in the rejuvenated asphalt binder in amounts ranging from about 6 wt. % to about 13.25 wt. % or alternatively from about 7.25 wt. % to about 12 wt. % based on the total weight of the rejuvenated asphalt binder.

Block copolymer: The rejuvenated asphalt binder further comprises a block copolymer composition comprising (a) a diblock copolymer and (b) one or more block copolymers comprising at least two blocks of monoalkenyl arene and at least one block of conjugated diene.

A diblock copolymer (a) suitable for use in the block copolymer composition may comprises one block of a monoalkenyl arene and one block of a conjugated diene. In an aspect, the diblock copolymer has a peak molecular weight from about 30,000 g/mol to about 78,000 g/mol and a vinyl content from about 35 to about 80 mol percent based on the number of repeat monomer units in the conjugated diene block.

The block copolymer composition further comprises one or more block copolymers comprising at least two blocks of monoalkenyl arene and at least one block of conjugated diene wherein the block copolymers (b). In an aspect block copolymers (b) comprise (i) linear triblock copolymers having a peak molecular weight that is from about 1.5 to about 3.0 times the peak molecular weight of the diblock copolymer (a) and a vinyl content from about 35 to about 80 mol percent based on the number of repeat monomer units in the conjugated diene block, (ii) multiarm coupled block copolymers having a peak molecular weight that is about 1.5 to about 9.0 times the peak molecular weight of the diblock copolymer (a) and a vinyl content from about 35 to about 80 mol percent based on the number of repeat monomer units in the conjugated diene block, and mixtures thereof, and the ratio of i to ii is greater than 1:1.

In an aspect of the present disclosure, the block copolymer composition is unhydrogenated. In one aspect of the present disclosure, the diblock copolymer (a) is of the formula A-B, the linear triblock copolymer is of the formula A-B-A and the multiarm coupled block copolymer is of the formula $(A\text{-}B)_nX$, such that A is a monoalkenyl arene block, B is a conjugated diene block, n is an integer from 2 to 6 and X is the residue of a coupling agent. In an alternative aspect, when the multiarm coupled block copolymers of the formula $(A\text{-}B)_nX$ are utilized, n may be an integer from 2 to 4 or alternatively 2.

The monoalkenyl arene block of the block copolymer (b) may be any monovinyl aromatic hydrocarbon suitable for use in the present disclosure such as styrene, o-methylstyrene, p-methylstyrene, p-tert-butylstyrene, 2,4-dimethylstyrene, alpha-methylstyrene, vinylnaphthalene, vinyltoluene and vinylxylene or mixtures thereof, alternatively the monovinylaromatic hydrocarbon for use in the present disclosure is styrene, which is used as a substantially pure monomer or as a major component in mixtures with minor proportions of other structurally related vinyl aromatic monomer(s) such as o-methylstyrene, p-methylstyrene, p-tert-butylstyrene, 2,4-dimethylstyrene, $\alpha$-methylstyrene, vinylnaphtalene, vinyltoluene and vinylxylene, i.e., in proportions of up to 10% by weight. In an aspect, the monoalkenyl arene block comprises substantially pure styrene.

Similarly, the conjugated diene block of the block copolymer (b) may be any conjugated diene suitable for use in the present disclosure, alternatively the conjugated diene has from four to eight carbon atoms. In an aspect, the conjugated diene used for the preparation of the conjugated diene blocks in the present disclosure is a butadiene monomer or an isoprene monomer that is substantially pure monomer or contains minor proportions, up to 10% by weight, of structurally related conjugated dienes, such as 2,3-dimethyl-1,3-butadiene, 1,3-pentadiene and 1,3-hexadiene. Alternatively, substantially pure butadiene or substantially pure isoprene is utilized for the preparation of the conjugated diene blocks, or alternatively substantially pure butadiene. It is to be understood that the conjugated diene block may also comprise a mixture of butadiene and isoprene monomers.

The peak molecular weight of each monoalkenyl arene block of block copolymer (b) may be from about 10,000 g/mol to about 25,000 g/mol, alternatively from about 12,000 g/mol to about 20,000 g/mol. In an alternative aspect, the peak molecular weight is from about 14,000 g/mol to about 18,000 g/mol.

In an aspect each diblock copolymer (a) utilized in the present disclosure will have a peak molecular weight from about 30,000 g/mol to about 78,000 g/mol, alternatively from about 48,000 g/mol to about 78,000 g/mol. The peak molecular weight of the linear triblock copolymers and/or multiarm coupled block copolymers (b) is dependent upon the peak molecular weight of the diblock copolymers (a) utilized. More specifically, the peak molecular weight of the triblock copolymers (b) will range from about 1.5 to about 3.0 times the peak molecular weight of the diblock copolymer (a). Alternatively, in those aspects where the block copolymer (b) is a linear triblock copolymer, the peak molecular weight of the linear triblock copolymers will range from about 1.8 to about 2.5 times the peak molecular weight of the diblock copolymer (a). The peak molecular weight of the multiarm coupled block copolymers (b) will range from about 1.5 to about 9.0 times the peak molecular weight of the diblock copolymer (a). In those aspects where the block copolymer (b) is a multiarm coupled block copolymer, the peak molecular weight will alternatively range from about 1.8 to about 5.0 times the peak molecular weight of the diblock copolymer (a).

It will be appreciated that the term "vinyl content" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C═C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, in an aspect from about 35 mole percent (mol %) to about 80 mol % of the condensed butadiene units in the polymer block have a 1,2-addition configuration. Alternatively, from about 46 mol % to about 70 mol % of the condensed butadiene units should have 1,2-addition configuration, alternatively from about 50 mol % to about 65 mol % of the butadiene units should have 1,2-addition configuration, or alternatively from about 52 mol % to about 65 mol % of the butadiene units should have 1,2-addition configuration. When referring to the use of isoprene as the conjugated diene, in an aspect from about 35 mol % to 80 mol % of the condensed isoprene units in the block have 3,4-addition configuration. Alternatively, from about 46 mol % to about 70 mol % of the condensed isoprene units in the block have 3,4-addition configuration, alternatively from about 50 mol % to about 65 mol % of the isoprene units should have 3,4-addition configuration, or alternatively from about 52 mol % to about 65 mol % of the butadiene units should have 1,2-addition configuration.

The monoalkenyl arene content of the block copolymers (b) (in the present case with regard to each individual diblock copolymer, linear triblock copolymer or multiarm coupled block copolymer) is suitably from about 10 wt. % to about 55 wt. % based on the total weight of the block copolymer (b). Alternatively, the content of monoalkenyl arene of the block copolymer (b) will be from about 15 wt. % to about 45 wt. %, alternatively from about 22 wt. % to about 37% wt. %, or alternatively from about 25 wt. % to about 35 wt. % based on the total weight of the block copolymer (b).

The block copolymer compositions of the present disclosure will have a melt flow rate or melt index greater than 15 g/10 min. Broadly, the block copolymer compositions of the present disclosure have a melt index greater than 15 grams/10 min. Alternatively, the melt index will range from greater than 15 g/10 min to about 50 grams/10 min. or alternatively from about 16 g/10 min to about 35 grams/10 min.

As noted above, the block copolymer composition may comprise a mixture of diblock copolymer and either a linear triblock copolymer, a multiarm coupled block copolymer, or mixtures thereof. Alternatively, the combination of diblock copolymer and multiarm coupled block copolymer is used. When the block copolymer composition comprises a mixture of diblock copolymer and either a linear triblock copolymer, a multiarm coupled block copolymer, or a mixture thereof, the ratio of the diblock copolymer to linear triblock copolymer, multiarm coupled block copolymer or mixture thereof will be greater than about 1:1 or alternatively equal to or greater than about 3:2. In an aspect, the ratio of the diblock copolymer to linear triblock copolymer, multiarm coupled block copolymer, or mixture thereof will be from about 3:2 to about 10:1 or alternatively from about 4:1 to about 7:3. In other words when the block copolymer composition comprises a diblock copolymer and either a linear triblock copolymer, a multiarm coupled block copolymer, or a mixture thereof, the linear triblock copolymer, multiarm coupled block copolymer, or mixture thereof will be present in an amount less than that of the diblock copolymer (e.g., the linear triblock copolymer, multiarm coupled block copolymer, or mixture thereof will be present in the block copolymer composition in an amount of equal to or less than about 49.9 wt. %, alternatively equal to or less than about 40 wt. % by weight).

In a still further aspect, a block copolymer composition is disclosed in which the ratio of the diblock copolymer to linear triblock copolymer, multiarm coupled block copolymer, or mixture thereof is equal to or greater than 3:2, the vinyl content of each copolymer is from about 35 mol % to about 80 mol % based on the number of repeat monomer units in the conjugated diene block of the copolymer, and the peak molecular weights of the diblock and linear triblock copolymer, multiarm coupled block copolymer, or mixtures thereof are such that the weighted average molecular weights of the diblock copolymer and other block copolymer are less than 100,000 g/mol. Take for example a composition containing a diblock copolymer (A-B) and a multiarm coupled block copolymer ($(A-B)_2X$) having a ratio of diblock copolymer to multiarm coupled block copolymer of 3:2. When the peak molecular weight of the diblock is about 55,000 g/mol, the peak molecular weight of the multiarm coupled block copolymer will be about 110,000 g/mol. Accordingly, the block copolymer composition will comprise 60% diblock copolymer and 40% multiarm coupled block copolymer. Therefore, 55,000 g/mol X 0.60 is equal to 33,000 g/mol while 110,000 g/mol X 0.40 is equal to 44,000 g/mol. The sum of 33,000 g/mol and 44,000 g/mol gives the weighted average molecular weight of the block copolymer composition. In this particular example, the weighted average molecular weight is 77,000 g/mol, less than 100,000 g/mol.

"Diblock copolymer", references that proportion of free diblock which is finally present in the applied block copolymer composition. When the block copolymer composition is prepared via a full sequential polymerization, no material detectable amounts of unreacted components occurs. In this situation, the finally desired amount of diblock can be adjusted to achieve the amount of diblock necessary for the present disclosure. Accordingly, when the block copolymer composition comprises a diblock copolymer in combination with a linear triblock copolymer made by full sequential polymerization, the amount of monoalkenyl arene added in the final step of preparing the block copolymer can be adjusted to limit the total amount of triblock copolymer or in the alternative, a sufficient amount of the diblock copolymer can be added to the fully polymerized linear triblock copolymer to achieve the necessary ratio.

When the block copolymers are prepared via initial preparation of intermediate living diblock copolymers, which are subsequently coupled by means of a multivalent coupling agent, the initial diblock content will be determined by the coupling efficiency. Normally in the preparation of most block copolymers, a coupling efficiency in the range of from 80 wt. % to 97 wt. % is desirable. This means that uncoupled diblock and/or unreacted components comprises 20 to 3 wt. %, respectively. Since the uncoupled diblock generally makes up the largest wt. %, herein after this component will be referred to merely as uncoupled diblock even though it may have a small amount of unreacted components.

It is possible to utilize polymers having a coupling efficiency of up to 50%. Alternatively, there is an even lower degree of coupling (equal to or less than 40% coupling efficiency). For purposes of the present disclosure, the phrase "coupling efficiency" refers to the number of molecules of coupled diblock copolymer divided by the number of molecules of coupled polymer plus the number of molecules of uncoupled polymer. For example, if a coupling efficiency is 80 wt. %, then the polymer will contain 20 wt. % diblock copolymer and any unreacted components such as monomers or polymers.

The block copolymer compositions may be prepared by any suitable methodology such as the full sequential polymerization method, optionally in combination with reinitiation, and the coupling method, as illustrated for example. U.S. Pat. Nos. 3,231,635; 3,251,905; 3,390,207; 3,598,887, 4,219,627, EP 0413294 A2, EP 0387671 B1, EP 0636654 A1 and WO 94/22931, incorporated herein by reference.

The block copolymers may therefore, for example, be prepared by coupling at least two diblock copolymer molecules together. The coupling agent may be any di- or polyfunctional coupling agent known in the art, for example, dibromoethane, diethyl adipate, divinylbenzene, dimethyldichlorosilane, methyl dichlorosilane, silicon tetrachloride and alkoxy silanes (U.S. Pat. Nos. 3,244,664, 3,692,874, 4,076,915, 5,075,377, 5,272,214 and 5,681,895), polyepoxides, polyisocyanates, polyimines, polyaldehydes, polyketones, polyanhydrides, polyesters, polyhalides (U.S. Pat. No. 3,281,383); diesters (U.S. Pat. No. 3,594,452); methoxy silanes (U.S. Pat. No. 3,880,954); divinyl benzene (U.S. Pat. No. 3,985,830); 1,3,5-benzenetricarboxylic acid trichloride (U.S. Pat. No. 4,104,332); glycidoxytrimethoxy silanes (U.S. Pat. No. 4,185,042); and oxydipropylbis(trimethoxy silane) (U.S. Pat. No. 4,379,891), all incorporated herein by reference.

In general, the polymers may be prepared by contacting the monomer or monomers with an organoalkali metal compound in a suitable solvent at a temperature within from about −150° C. to about 300° C., alternatively at a temperature within the range of from about 0° C. to about 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec butyl is preferred. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents include but are not limited to aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. In an aspect, the solvents are cyclopentane or cyclohexane.

Techniques to enhance the vinyl content of the conjugated diene portion may involve the use of polar compounds such as ethers, amines and other Lewis bases and more in particular those selected from the group consisting of dialkylethers of glycols. In an aspect modifiers to enhance the vinyl content of the conjugated diene portion may comprise dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane or alternatively 1,2-diethoxypropane.

In an aspect, the block copolymer may be present in the rejuvenated asphalt binder in an amount of from about 6.5 wt. % to about 8.5 wt. % or alternatively from about 7 wt. % to about 8 wt. % based on the total weight of the asphalt binder.

Optional sulfur-donor crosslinking agent: In one aspect, the rejuvenated asphalt binder further comprises a sulfur-donor crosslinking agent. Examples include but are not limited to elemental sulfur, hydrocarbyl polysulphides, sulfur donor vulcanization accelerators, or mixtures of such products with one another and/or with vulcanization accelerators which are not sulfur donors. In an aspect, the sulfur-donor coupling agent comprises a product designated M, which contains by weight, from 0% to 100% of a component CA composed of one or more sulfur-donor vulcanization accelerators and from 100% to 0% of a component CB composed of one or more vulcanizing agents comprising elemental sulfur or hydrocarbyl polysulphides. In an alternative aspect, the sulfur-donor coupling agent comprises a product designated N which contains a component CC composed of one or more vulcanization accelerators which are not sulfur donors and a product M in a ratio by weight of the component CC to the product M ranging from 0.01 to 1, alternatively from 0.05 to 0.5.

In an aspect, the rejuvenated asphalt binder comprises elemental sulfur in any form, for example in the flower form where "sulfur in flower form" refers to a very fine form of bright yellow sulfur powder obtained by sublimation. Alternatively, the elemental sulfur is sulfur crystallized in the orthorhombic form and known by the name of alpha sulfur.

The sulfur-donor crosslinking agent may be present in the rejuvenated asphalt binder in an amount of from about 0 to about 1 wt. %, alternatively from about 0.05 wt. % to about 0.3 wt. % based on the total weight of the rejuvenated asphalt binder.

Optional antioxidant(s): In one aspect, the rejuvenated asphalt binder composition may comprise an optional antioxidant such as primary antioxidants, secondary antioxidants, and carbon radical scavengers. Most antioxidants fall into the category of primary and secondary antioxidants and have different functions due to different chemical structures. A primary antioxidant is typically a hindered phenol or arylamines. Primary antioxidants scavenge alkoxy radicals and peroxy radicals. Many primary antioxidants that are compatible with styrenic block copolymers may be incorporated into the rejuvenated asphalt binder. Other primary antioxidant examples include butylated hydroxytoluene ($C_{15}H_{24}O$). These primary antioxidants may be included in the composition in amounts of less than 1 wt. %, from about 0.3 to 1 wt. %, or alternatively from about 0.5 wt. % to about 1 wt. % based on the total weight of the composition. Secondary antioxidants may also be optionally used along with the primary antioxidants. Examples include phosphites and thiosynergists. Secondary antioxidants scavenge hydroperoxides which are generated during the autoxidation cycle of a polymer exposed to heat and oxygen. These secondary antioxidants may be included in the composition in amounts ranging from about 0.5 wt. % to about 2.5 wt. % or alternatively from about 0.5 wt. % to 2 wt. % based on the total weight of the composition. Carbon radical scavengers are considered to be a third category of antioxidant. Carbon radical scavengers may be included in amounts ranging from about 0.5 wt. % to about 2.5 wt. %, or alternatively from about 0.5 wt. % to 2 wt. % based on the total weight of the composition.

Methods for making: In an aspect, a method of preparing the rejuvenated asphalt binder comprises contacting of the components of the rejuvenated asphalt binder (e.g., asphalt binder, block copolymer composition, bio-oil and optional components) in any order in a vessel in one location or in different locations, or multiple vessels in one location or different locations, with the addition all at the same time or at different intervals, under conditions suitable for formation of the rejuvenated asphalt binder. The components may be mixed together in the same mixing vessel within a short period of time or at intervals, or some of the components may be mixed in one location, and other component(s) may be subsequently added at a different location along with other components such as virgin aggregate and/or reclaimed or recycled asphalt.

In one embodiment, an asphalt binder is first mixed with a block copolymer under sufficient conditions (e.g., high temperature) to blend the polymer into the bitumen forming a first mixture. The first mixture is then mixed with virgin aggregate forming a second mixture. In a separate step, bio-oil is combined with RAP and/or RAS forming a third mixture. The third mixture can be combined with the second mixture at location, forming a paving composition, with a final block copolymer to bio-oil ratio ranging from 1:7 to 3:1.

Amounts of the bio-oil and the block copolymer in the rejuvenated asphalt binder may vary in a ratio ranging from 1:7 to 3:1 in one embodiment, from 1:5 to 2:1 in a second embodiment; and from 1:3 to 1:1 in a third embodiment. In yet another embodiment, In yet another aspect, the amounts of bio-oil, copolymer, and asphalt binder (bitumen) in the rejuvenated asphalt binder vary in the ranges (as wt. %) according to the table:

| Bio-oil | Copolymer | Asphalt Binder | Bio-oil/ Asphalt Binder | Copolymer/ Asphalt Binder |
|---|---|---|---|---|
| 6 | 2 | 92 | 6.5 | 2.2 |
| 6 | 10 | 84 | 7.1 | 11.9 |
| 13 | 2 | 85 | 15.3 | 2.4 |
| 13 | 10 | 77 | 16.9 | 13.0 |

In an aspect, a rejuvenated asphalt binder may be prepared by contacting an asphalt binder with a bio-oil to produce a first mixture, which may then be thermally treated until the first mixture equilibrates at a temperature ranging from 180° C. to 220° C., or from 180° C. to about 200° C. Upon equilibration, a block copolymer may be added to the first mixture to produce a second mixture, which is allowed to equilibrate with or without agitation until the block copolymer composition dissolves. In an aspect, the second mixture may be heat-cured at a temperature in the range of from about 160° C.-220° C., alternatively from 170° C.-210° C., or from 180° C.-200° C. for 1-40 hours, or 2-30 hours, or 3-8 hours to form the rejuvenated asphalt binder. Alternatively, the second mixture is optionally crosslinked in the presence of a sulfur-donor crosslinking agent. In such aspects, crosslinking may be carried out at a temperature ranging from 160° C.-220° C., for a rejuvenated asphalt binder as end-result.

In an alternative aspect, a rejuvenated asphalt binder may be prepared adding a block copolymer to an asphalt binder forming a first mixture. The first mixture may be blended at a temperature from about 160° C.-220° C. to facilitate polymer dissolution into the mixture. A bio-oil is then added to the first mixture to forming a second mixture. The second mixture may be heat cured at a temperature from 160° C.-220° C., alternatively from 170° C.-210° C., or alternatively from 180° C.-200° C. for a time period of from about 1 hour to about 40 hours, alternatively from about 2 hours to about 30 hours or alternatively from about 3 hours to about 8 hours to from the rejuvenated asphalt binder. Alternatively, the second mixture is optionally crosslinked in the presence of a sulfur-donor crosslinking agent of the type disclosed herein. In such aspects, crosslinking may be carried out at a temperature ranging from about 160° C. to about 220° C. The resulting mixture is the rejuvenated asphalt binder.

In yet another aspect, a rejuvenated asphalt binder may be prepared by heating an asphalt binder to a temperature ranging from about 120° C. to about 160° C. to which bio-oil is introduced to form a first mixture. The amount of asphalt binder in the first mixture may be less than the amount to be included in the final rejuvenated asphalt binder. For example, if the targeted amount of asphalt binder in the rejuvenated asphalt binder is 78 wt. %, then the first mixture may be formed by introducing about 40 wt. % of the asphalt binder to the bio-oil. In an aspect the first mixture may be equilibrated to a temperature ranging from about 180° C. to about 220° C. Once equilibrated a block copolymer of the type disclosed herein may be added to the first mixture to form the second mixture. The amount of block copolymer may be more than the amount intended to be present in the final rejuvenated asphalt binder. The block copolymer may be allowed to equilibrate, with agitation, until it dissolves. In an aspect, the method further comprises the addition of asphalt binder to the second mixture in an amount sufficient to reach the target concentration and concomitantly adjust the polymer concentration to its intended value thus providing a third mixture. In an aspect, the third mixture may be heat cured at a temperature in the range of from 160° C. to about 220° C., alternatively from about 170° C. to about 210° C., or alternatively from about 180° C. to about 200° C. for a time period of from about 1 hour to about 40 hours, alternatively from about 2 hours to about 30 hours or alternatively from about 3 hours to about 8 hours to form the rejuvenated asphalt binder. Alternatively, the third mixture is optionally crosslinked in the presence of a sulfur-donor crosslinking agent of the type disclosed herein. In such aspects, crosslinking may be carried out at a temperature ranging from about 160° C. to about 220° C. The resulting mixture is the rejuvenated asphalt binder.

In an aspect, a rejuvenated asphalt binder is an unaged material. Herein an "unaged material" refers to material as prepared in the described process without any further artificial or actual aging. Further, a rejuvenated asphalt binder of the present disclosure may be characterized by a rotational viscosity at 135° C. of equal to or less than about 1000 centipoise (cps), alternatively from about 500 cps to about 950 cps, or alternatively from about 700 cps to about 900 cps.

In an aspect, the rejuvenated asphalt binder is characterized has having an original G*/sin δ at 64° C. of equal to or greater than about 1 kPa or alternatively greater than about 1.2 kPa where G* is the complex shear modulus and δ is the phase angle.

In an aspect, a rejuvenated binder is aged in Rolling Thin Film Oven, and after aging is characterized by a G*/sin δ at 64° C. of equal to or greater than about 2.2 kPa, or alternatively greater than about 2.4 kPa and % recovery at 3.2 kPa of equal to or greater than about 80% or alternatively greater than about 90%.

In an aspect, a rejuvenated binder is aged for 20 hours at 100° C. in a PAV after RTFO aging and after PAV aging is characterized by a creep stiffness S of less than about 300 MPa or alternatively less than about 250 MPa and a m value of greater than about 0.300 or alternatively greater than about 0.310 at −30° C.

In an aspect, a rejuvenated is aged for 40 hours at 100° C. in a PAV after RTFO aging and after PAV aging is characterized by a creep stiffness S of less than about 300 MPa or alternatively less than about 250 MPa and a m value of greater than about 0.300 or alternatively greater than about 0.310 at −30° C. The flexural creep stiffness, Se (t), n—the creep stiffness obtained by fitting a second order polynomial to the logarithm of the measured stiffness at 8.0, 15.0, 30.0 60.0, 120.0, and 240.0 s and the logarithm of time. The measured flexural creep stiffness, Sm (t), n—the ratio obtained by dividing the measured maximum bending stress by the measured maximum bending strain. Flexural creep stiffness has been used historically in asphalt technology while creep compliance is commonly used in studies of viscoelasticity. The m-value, the absolute value of the slope of the logarithm of the stiffness curve versus the logarithm of time. A high creep stiffness (>300 MPa) combined with low m-value (<0.300) are indicative of binder's susceptibility to thermal cracking.

In an aspect, a rejuvenated asphalt binder may be present in a CAR in an amount of from about 0.5 wt. % to about 15 wt. %, alternatively from about 0.8 wt. % to about 9 wt. %, alternatively from about 2 wt. % to about 8 wt. %, or alternatively form about 3 wt. % to about 6 wt. % based on the total weight of the CAR.

In an aspect a CAR of the type disclosed herein comprises virgin aggregate. Herein virgin aggregate is a mixture of coarse aggregate, fine aggregate and filler). Virgin aggregate refers to a mixture of coarse and fine aggregates (crushed rock), filler (dust and/or hydrated lime).

Generally the aggregate size for the paving composition follows specification detailed in AASHTO M 43-05 (2013) "Sizes of Aggregate for Road and Bridge Construction", which provides detailed ranges for coarse aggregate depending on nominal aggregate size and AASHTO M 29-12 "Fine Aggregate for Bituminous Paving Mixtures", which covers fine aggregate for use in bituminous paving materials. Additionally, AASHTO M17-11 (2015) "Mineral Filler for Bituminous Paving Mixtures" details mineral filler added as a separate ingredient for use in bituminous paving mixtures.

In an aspect, a virgin aggregate is present in the CAR in an amount of from about 34 wt. % to about 58.8 wt. % or alternatively from about 40 wt. % to about 50 wt. % based on the total weight of the CAR.

In an aspect, a CAR of the type disclosed herein comprises reclaimed asphalt pavement (RAP). RAP refers to removed and/or reprocessed pavement materials containing asphalt and aggregates. These materials are generated when asphalt pavements are removed for reconstruction, resurfacing, or to obtain access to buried utilities. In an aspect, the RAP is reclaimed from old road surfaces and consists of aggregate and aged binder (binder is pitch, tar, asphalt, bitumen). In an optional aspect, the CAR comprises Reclaimed Asphalt Shingles (RAS). RAS is generally a local product obtained from shingle manufacturers disposing of scrap production material or from old roofs. RAS is typically composed of hard oxidized pitch, fiberglass mat and fine aggregate.

In an aspect, the RAP may be present in an amount of from about 30 wt. % to about 60 wt. %, alternatively from about 40 wt. % to about 60 wt. % or alternatively from about 45 wt. % to about 55 wt. % based on the total weight of the CAR. In an aspect, the CAR comprises a RAP/RAS mixture where small amounts of RAS such as equal to or less than about 10 wt. % of the total wt. of RAS/RAP mixture or alternatively about 5 or less wt. % of the RAS/RAP mixture are suitable.

In an aspect, a method of preparing a CAR of the type disclosed herein comprises contacting a virgin aggregate with a RAP and the rejuvenated asphalt binder in a suitable vessel to form a mixture. The mixture may then be combined to form the rejuvenated CAR.

The CAR may exhibit one or more properties that will depend on the type of asphalt mixture design. In an aspect, the CAR has performance parameters similar to those of an asphalt mixture of similar gradation which contains less than about 0-30% of a RAP and where asphalt binder contains 0-3.5% elastomer type polymer.

The amount of rejuvenated asphalt blend needed to make a suitable product depends on the service life of the RAP, and the conditions such as the temperature the RAP was exposed to during its lifetime. UV rays from the sun and oxidation of the RAP due to temperature exposure makes the RAP brittle and prone to cracking. RAP material should contain very little moisture to ensure quick and uniform heating of the material. RAP material is typically heated indirectly in batch or continuous production via heat transfer from virgin aggregate/asphalt part of the CAR. The final composition containing RAP, virgin asphalt and rejuvenator (i.e., CAR) should attain a temperature sufficient for proper paving, typically about 150° C. to about 175° C.

In an aspect of preparing the CAR, the RAP is typically crushed and sieved before it is recycled with asphalt rejuvenator. The rejuvenated asphalt binder reinvigorates the sieved RAP allowing a well-blended uniform and consistent product.

In an aspect, RAP may be present in a CAR in amount of from 30 to 65 wt. %, preferably from 40-60 wt. %, and more preferably from about 40-50 wt. % based upon the total amount of CAR. Virgin aggregate may be present in a CAR in an amount of from about 35-60 wt. %, preferably from about 40-60 wt. % and more preferably from about 50 to about 60 wt. % based upon the total amount of CAR.

In yet another aspect, a method of preparing a CAR comprises preparing a first mixture, a rejuvenated asphalt binder, comprising (i) asphalt binder; (ii) a bio-oil; (iii) sulfur; and (iv) the block copolymer composition. In such aspects the asphalt binder may comprise virgin binder. The method may further comprise preparing a second mixture, a rejuvenated asphalt pavement, comprising (a) RAP; (b) bio-oil; and (c) virgin aggregate. In such aspects RAP may comprise reclaimed binder and reclaimed aggregate. A CAR may be formed via the combination of the first and second mixtures.

In such aspects, the composition of the first mixture is dependent on an amount of bio-oil in the second mixture. Typically, the second mixture may contain bio-oil in an amount of from about 3 wt. % to about 9 wt. %, preferably from about 4 wt. % to about 7 wt. % based upon the amount of the reclaimed binder present in the reclaimed asphalt pavement. The reclaimed asphalt pavement may comprise the reclaimed binder in an amount of from 4 wt. % to about 6 wt. % based upon the total amount of the reclaimed asphalt pavement.

The composition of the first mixture may be determined by formulating a combination of the said first mixture and the amount of the bio-oil from the second mixture in order to meet physical properties described herein. The total amount of the bio-oil is then split between the first mixture and the second mixture. In an aspect, the amount of the bio-oil present in the first mixture is reduced by an amount to be added to the second mixture. In this way, the physical properties of the first mixture, or the rejuvenated asphalt binder, are determined and the first mixture can be formulated.

In an aspect, the amount of the bio-oil added to the second mixture may be from about 3 wt. % to about 7 wt. % and preferably from about 4 wt. % to about 6 wt. % based upon the total amount of the bio-oil and the rejuvenated asphalt binder. The amount of a bio-oil in the first mixture, the rejuvenated asphalt binder, may range from about 0 wt. % to about 50 wt. %, and more likely from about 7 wt. % to about 30 wt. % based upon the combined amount of the oil and the first mixture, the rejuvenated asphalt binder.

Alternatively, a first mixture may comprise a softening agent instead of a bio-oil, or a softening agent and a bio-oil in combination. The softening agent suitable for use herein may include but not limited to bio-oil (including TOFA, CTO, pitch), mineral oil, and soft asphalt (flux). In some aspects the asphalt binder may comprise a paving grade asphalt, a soft asphalt such as flux or combinations thereof. It is contemplated that in such aspects the asphalt binder is sufficiently soft that the oil component can be excluded from the first mixture. In such aspects, the second mixture may still comprise bio-oil. However, the total amount of the bio-oil present in the CAR may be less than the ranges previously disclosed herein for the amount of bio-oil present in a CAR. Paving grade asphalt may be maximized in any of the compositions described herein. In an aspect, the rejuvenated asphalt binder may comprise at most 88 wt. %, preferably at most 82 wt. % and more preferably no more than 50 wt. % of the paving grade asphalt based upon the total amount of the rejuvenated asphalt binder.

In aspects wherein the CAR is prepared using the combination of first and second mixtures, the sum of the amount of oil (ii) and bio-oil (b) is within the ranges previously disclosed herein for the amount of bio-oil present in a CAR. In such aspects, the oil (ii) and the bio-oil (b) may be the same or different.

In an aspect, a CAR of the type disclosed herein is prepared by the combining of (a) a rejuvenated asphalt binder; (b) a reclaimed asphalt pavement (RAP) and (c) virgin aggregate. In such aspects the rejuvenated asphalt binder may comprise (i) asphalt binder; (ii) a bio-oil; (iii) a block copolymer composition and (iv) sulfur. In such aspects the RAP may comprise (i) reclaimed aggregate and (ii) a reclaimed binder. The rejuvenated asphalt pavement may comprise (i) virgin aggregate; (ii) RAP; and (iii) a bio-oil.

In yet another aspect, the rejuvenated asphalt binder composition consisting essentially of (i) an asphalt binder (bitumen); (ii) a bio-oil; (iii) a block copolymer composition and (iv) optional sulfur may be prepared by spraying the block copolymer composition (iii) with a bio-oil (ii) prior to forming an oleaginous polymer composition that is subsequently contacted with the asphalt binder and sulfur. The rejuvenated asphalt binder thus formed may be further contacted with the rejuvenated asphalt binder and virgin aggregate to form a CAR.

In one example, the sum of the bio-oil in the rejuvenated asphalt binder and rejuvenated asphalt pavement may be within the ranges disclosed previously herein in a CAR. In such aspects, the bio-oil (ii) of the first mixture and the bio-oil (b) of the second mixture may be the same and both of the type disclosed previously herein. In an alternative aspect, a bio-oil (ii) for use in the first mixture differs from a bio-oil (b) of the type disclosed herein.

In some aspects, the oil (ii) may comprise any oil suitable for use in the present disclosure and compatible with the other components of the CAR. For example, the oil (ii) may comprise paraffinic oils, mineral oils, gas to liquid (GTL) oils, synthetic oils, or combinations thereof.

In an aspect, the oil (ii) comprises a paraffinic oil. In some aspects, the paraffinic oil includes an oil-enriched in paraffin. Alternatively, a paraffinic oil is characterized by the presence of hydrocarbons having from 12 carbon atoms to 50 carbon atoms. Alternatively, the paraffinic oil includes a paraffin having an average number of carbon atoms that is less than or equal to about 20 (e.g., 16). In certain aspects, the paraffinic oil includes a paraffin having an average number of carbon atoms of from 16 to 30. In some aspects, a paraffinic oil suitable for use in the present disclosure can be a mixture of oils.

In an aspect, the oil (ii) comprises a mineral oil. Mineral oils are highly refined, colorless, and odorless petroleum oils. Mineral oil (also known as liquid petrolatum) is a by-product in the distillation of petroleum to produce gasoline. Mineral oil is a chemically inert oil composed mainly of linear, branched, and cyclic alkanes (paraffins) of various molecular weights.

In an aspect, the oil (ii) comprises a GTL-based process oil. GTL-based process oil is also referred to as Fischer-Tropsch derived oil. The term "Fischer-Tropsch derived" refers to a base oil, that is or is derived from, a synthesis product of a Fischer-Tropsch process. GTL-based process oils have a uniform chemical structure because they are manufactured from hydrocarbons derived from natural gas rather than crude oil.

In an aspect, the oil (ii) comprises a synthetic oil. Herein a synthetic oil refer to those oils that include non-naturally occurring components derived through chemical processes.

In an aspect, the oil (ii) comprises a mineral oil, a synthetic oil, or paraffinic fluids; or an internal olefin. Alternatively, the oil may comprise a synthetic oil, alternatively paraffinic oil, or alternatively internal olefin fluids such as $C_{16}$-$C_{18}$ internal olefin hydrocarbons.

Suitable mineral oils may be naphthenic- or paraffinic-based. In some aspects, the bio-oil comprises diesel, biodiesel and carboxylic acid esters such as 2-ethylhexyl oleate.

In an aspect, the oil is a GTL-based process oil, which is a hydrocarbon fluid based on Gas-to-Liquid technology that is highly saturated with a high degree of isoparaffinic structures.

The present disclosure also provides the CAR as a bituminous emulsion. The bituminous emulsions (e.g., CAR bituminous emulsion) are particularly useful in a variety of road and paving applications including fog seal, rejuvenator seal, scrub seal, prime coat, tack coat, chip seal, slurry seal, micro surfacing, and in central-plant or in-place recycling (cold in-place recycling, cold central plant recycling, full depth reclamation, and hot in-place recycling). With regard to the present disclosure, the bituminous emulsions will be used as pavement surface treatments for sealing and repairing roads, drive ways, parking lots and other black topped surfaces, as well as in recycle applications. The phrase "bituminous emulsions" is intended to also include bituminous dispersions.

The bituminous emulsions comprise a bitumen component that may be any naturally occurring bitumen or derived from petroleum. In addition, petroleum pitches obtained by a cracking process and coal tar can be used as the bitumen component as well as blends of various bitumen materials. Examples of suitable components include, but are not limited to, distillation or "straight-run bitumens", precipitation bitumens (e.g. propane bitumens), blown bitumens (e.g. catalytically blown bitumen), multigrades, and mixtures thereof. Other suitable bitumen components include, but are not limited to mixtures of one or more of these bitumens with extenders (fluxes) such as petroleum extracts, e.g. aromatic extracts, distillates or residues, or with oils. Suitable bitumen components (either "straight-run bitumens" or "fluxed bitumens") are those having a penetration of in the range of from about 110° C. to about 400 units at 25° C.; therefore quite hard bitumens of a penetration of from about 60 to about 70 units may be used, but generally a straight run or distilled bitumen having a penetration from about 110 units to about 250 units will be the most convenient to use. The penetration of the bitumen refers to the consistency of a sample of bitumen by determining the distance in tenths of a millimeter that a standard needle vertically penetrates the bitumen specimen under known conditions of loading, time and temperature The water that is utilized in the emulsions is demineralized water since minerals in other types of water may adversely react with the emulsion system.

In addition to bitumen, water and block polymers, one or more emulsifier systems may be added to the emulsions. The phrase "emulsifier system(s)" includes a system that contains one or more emulsifiers alone, one or more emulsifiers in combination with a mineral acid or one or more emulsifiers in combination with a base. Depending upon the type of emulsion desired (cationic, anionic or nonionic) the emulsifier(s) may be selected from: (a) for cationic emulsions, salts of fatty amines, amido amines and imidazolines (or from mixtures comprising members of two or more families noted for cationic emulsions or mixtures of two or more emulsifiers within each family noted for cationic emulsions), with amido amines; and (b) for anionic emulsions, salts of fatty acids, rosin acids, lignin sulphonates, bentonites and clays (or from mixtures comprising members of two or more families noted for anionic emulsions or mixtures of two or more emulsifiers within each family noted for anionic emulsions), with oleic acid. In the case of cationic emulsions, when amido amines are utilized, they can be mixed and reacted with a mineral acid, e.g. hydrochloric acid, nitric acid, phosphoric acid or sulfuric acid, to attain water solubility. Furthermore, in the case of anionic emulsions, typically bases such as sodium hydroxide are used to attain water solubility.

The bituminous emulsions can be manufactured using any suitable methodology for manufacturing bituminous emulsions such as by using colloidal mills or high shear mixers in a continuous process. The emulsions of the present disclosure can be prepared by mixing a bitumen component with an emulsifier solution containing one or more emulsifier systems. The bitumen component is prepared by blending bitumen with the block copolymer composition of the present disclosure.

The success of the final emulsion is not dependent upon the type of tank (or vessel) utilized to prepare the bitumen component. Accordingly, any known tank or vessel utilized in the preparation of bitumen compositions can be used provided that such tank or vessel has stirring (agitation) and heating capabilities. As used within the scope of the present disclosure, the phrase "stirred tank" refers to such tanks and vessels that have stirring (agitation) and heating means. Suitable stirring or agitation includes, but is not limited to, vertical impellers, side-arm impellers and pump around circulation. In terms of carrying out the process, the bitumen component is typically placed in the stirred tank and gradually heated to the desired temperature. In the case of the present disclosure, the bitumen will typically be heated to a temperature from about 145° C. to about 220° C., alternatively from about 165° C. to about 185° C. The bitumen component is typically stirred or agitated during this heating phase. While the presence of air is not detrimental to the process, e.g., the use of an open air vessel which results in the surface of the mixture coming in contact with air, the intentional introduction of air (as in the case of air curing or blown bitumen) is not necessary, and may result in the hardening of the bitumen component.

About 50 wt. % to 72 wt. % of the crosslinked bitumen/rejuvenator may be emulsified with from about 50 wt. % to 28 wt. % water/emulsifier. The water/emulsifier may contain about 0.1 wt. % to about 3 wt. % emulsifier.

The emulsifier solution can be prepared by simply adding one or more emulsifying system components (emulsifiers and mineral acid in the case of cationic emulsions, and emulsifiers and bases in the case of anionic emulsions) to water and heating the mixture to allow dissolving. Once the bitumen cross-linked rejuvenator component and emulsifier/water solution are prepared, they are mixed together, e.g. by being fed in separately but simultaneously into a colloid mill. The temperature of the bitumen component and emulsifier solution will vary depending upon the grade and percentage of bitumen in the emulsion, the type of emulsifier, etc. Generally, the bitumen component temperatures upon addition will be from about 120° C. to about 160° C., alternatively from about 135° C. to about 150° C., or alternatively about 145° C. although when high levels of polymer are used, it may be desirable to use slightly higher temperatures. The temperature of the emulsifier/water solution upon addition to the mixture will typically be from about 30° C. to about 60° C. or alternatively from about 45° C. to about 50° C. The two phases (bitumen/crosslinked rejuvenator component and emulsifier/water solution) are mixed together, e.g. in the colloid mill they are subjected to intense shearing forces which cause the bitumen to break into small globules. The individual globules may then coated with the emulsifier which gives the surface of the droplets an electrical charge (in the case of anionic or cationic emulsifiers) and the resulting electrostatic forces prevent the globules from coalescing. While the CAR emulsion has many uses due to its viscosity characteristics, certain applications such as fog seal call for a sprayable liquid composition. These applications typically dilute the emulsion with water forming a sprayable liquid composition, such as a 1:1 asphalt rejuvenator emulsion to water mixture. The CAR can also be further diluted with water. Moreover, the asphalt rejuvenator emulsion of the present disclosure can be initially made with more water.

Generally, the bitumen emulsions contain from about 50 wt. % to about 75 wt. %, alternatively from about 55 wt. % to 70 wt. %, of the dispersed phase, i.e. the bitumen plus rejuvenator (plus any other additives like cross-linker), and 50 wt. % to 25 wt. %, alternatively 30 wt. % to 45 wt. %, of water or aqueous phase, i.e. the water plus emulsifier system(s) and any other additives (said amounts based on the total of 100% of dispersed phase plus aqueous phase). To cover a fog seal application, as mentioned above, the amount of the aqueous phase can be doubled, for example beyond that mentioned herein.

The dispersed phase of the emulsion generally may comprise 100% rejuvenated asphalt binder. The water or aqueous phase of the emulsion will contain from about 0.1 wt. % to 3 wt. %, alternatively from about 0.2 wt. % to about 2.5 wt. %, of one or more emulsifier systems as defined hereinbefore, and from about 0.35 wt. % to about 0.6 wt. %, alternatively from about 0.45 wt. % to about 0.55 wt. %, of a mineral acid or base, and the remainder water (about 96.4 wt. % to about 99.5 wt. % water, said amounts based on the total of 100% of emulsifier system(s), mineral acid or base, and water).

In an aspect, the recycled asphalt may be used to coat roadway surfaces, parking lots, driveways, and the like. Recycled asphalt of the type disclosed herein can be used for any purpose, including any purpose for which virgin asphalt pavement can be used. For example, recycled RAP can be used for shoulder widening, pothole patching, as a base material and as a wearing course. The wearing (surface) course is the top layer of a road pavement and is usually designed to be durable, resistant to water penetration, resistant to deformation by traffic and have a high resistance to skidding.

Examples: The following examples provide performance mix results for four mixes. All four mixes contain 50% RAP by weight. Two mixes, both labeled KRATON (PG64E-40) contain described precursor composition at two concentration levels. Similarly two mixes, both labeled Standard (PG52-34) do not contain described precursor composition. Instead they contain regular paving grade asphalt (PG52-34) at two different concentrations levels.

The two different concentrations in the four mixes are quantified using ABR or Asphalt Binder Replacement ratio. ABR is used to quantify the amount or reclaimed binder from RAP used as effective binder in mixes formulation. For instance all four mixes were designed to contain 6.8% total asphalt binder per weight. 27% ABR means that approximately 1.84% of the 6.8% total asphalt binder comes from RAP. In case of 38.53% ABR 2.62% of total 6.8% asphalt binder came from RAP.

For the RAP source used in the mixes 38.53% ABR translated to 100% usability credit to binder from RAP. 27% ABR translated to 70% usability credit to binder from RAP. The other 30% of binder from RAP was deemed unusable.

The Texas Overlay Test, FIG. 1, helps to quantify the mix's potential of reflective cracking. New Jersey DOT uses this test as surrogate for fatigue cracking test. Their requirement for surface mix with PG76-22 binder, minimum 20% RAP is >175 cycles. At 28% ABR both KRATON and Standard mixes pass the requirement.

Figure 2:
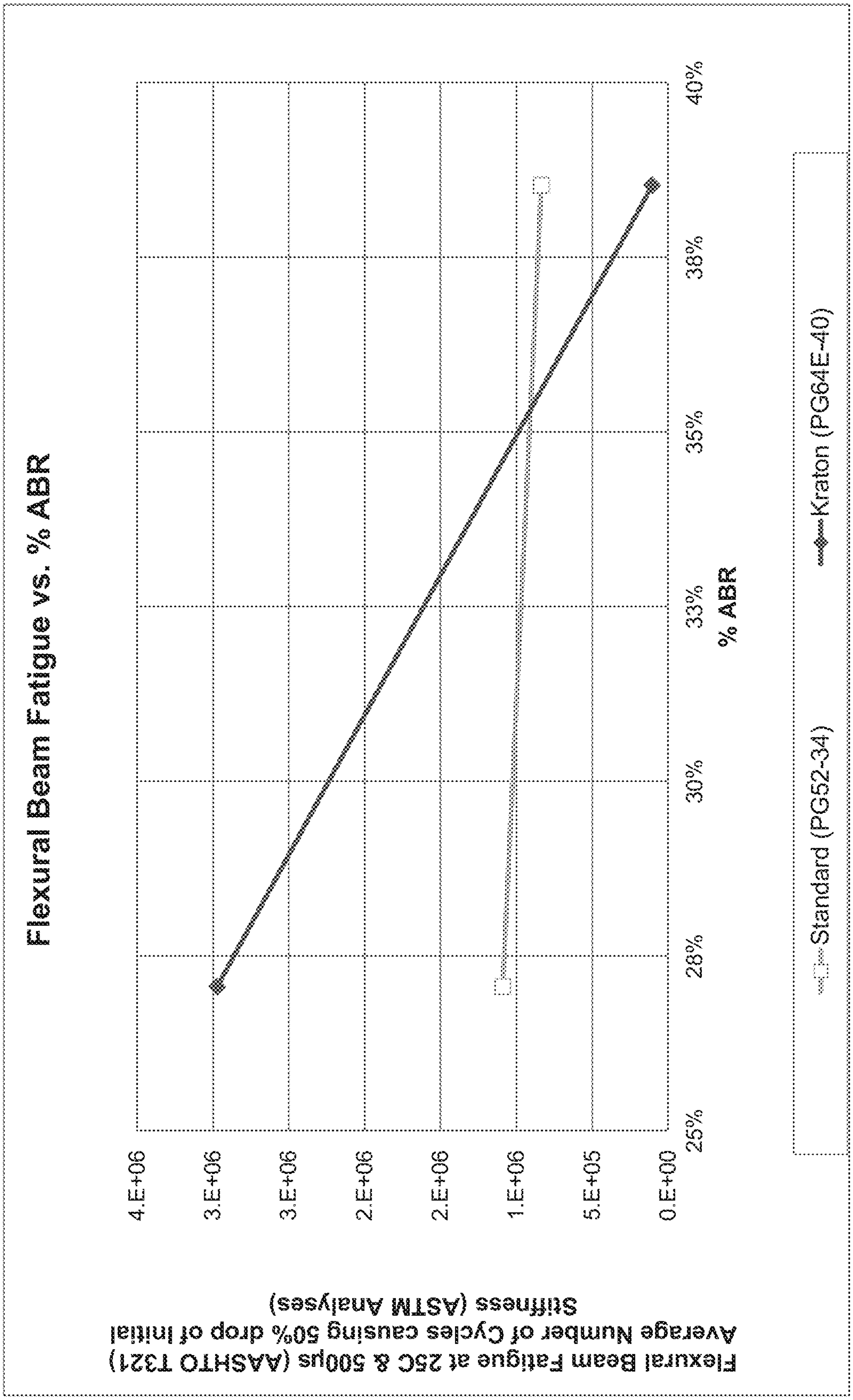
FIG. 2 is a plot of the results of a flexural beam fatigue test carried out on the samples of example 1.
Figure 3:
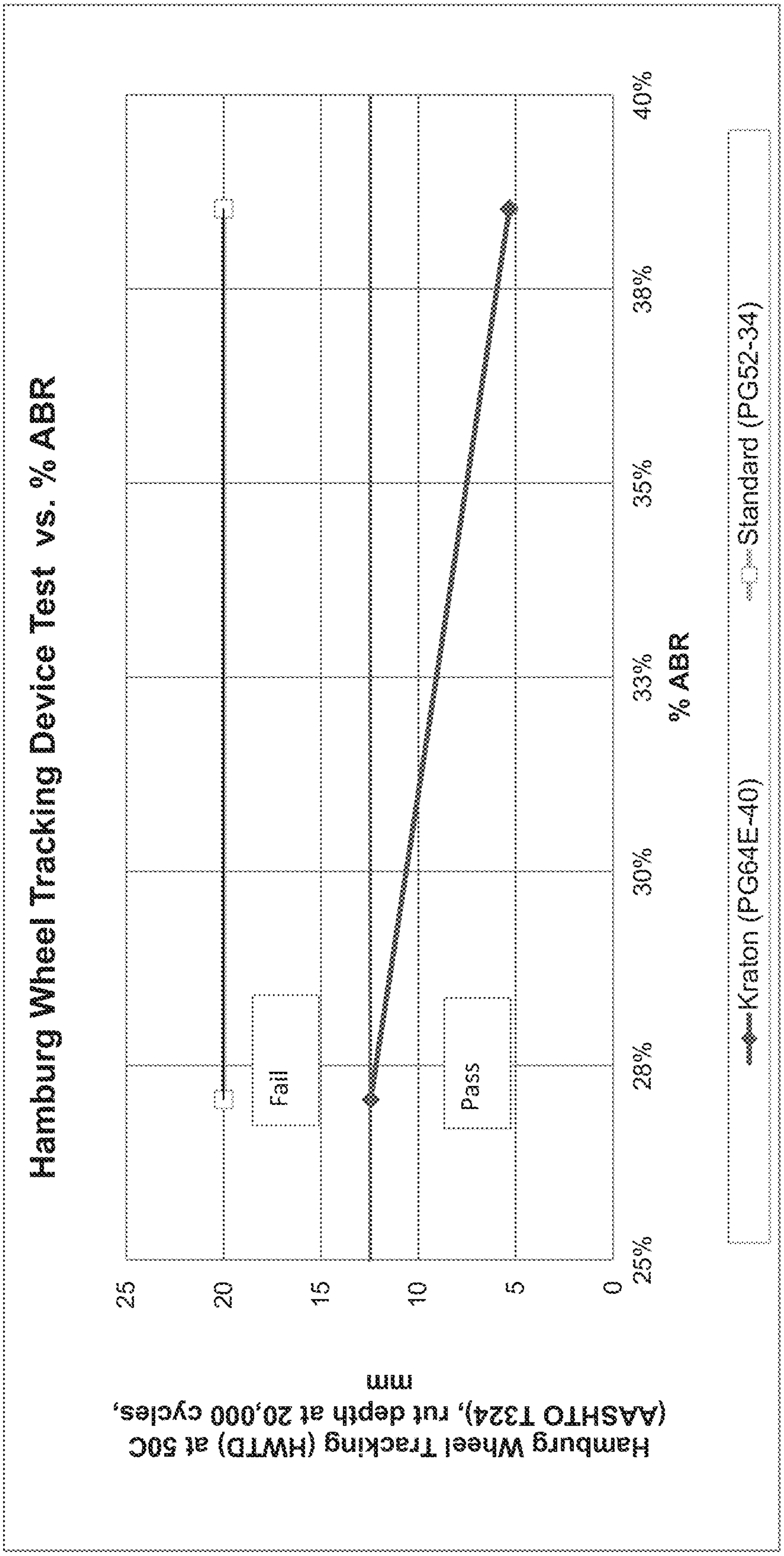
FIG. 3 is a plot of the results of a Hamburg wheel tracking device test carried out on the samples of example 1.

Flexural Beam Fatigue test, FIG. 2, is an indication of mixture's susceptibility to fatigue cracking. 500 microstrain is fairly large, and may be representative of thin pavement. KRATON mix exceeds standard mix in performance when ABR <35%.

The Hamburg Wheel Tracking Device Test (HWTD) measures asphalt mixture's susceptibility to rutting. Mixes showing high rut numbers after 20,000 cycles may be prone to rutting. 12.5 mm at 20,000 cycles can be thought of as limit for many pavement structures. Standard (PG52-34) mixes failed the test at much fewer cycles indicating very poor rutting performance, while KRATON (PG64E-40) mixes passed the limit.

Figure 4:
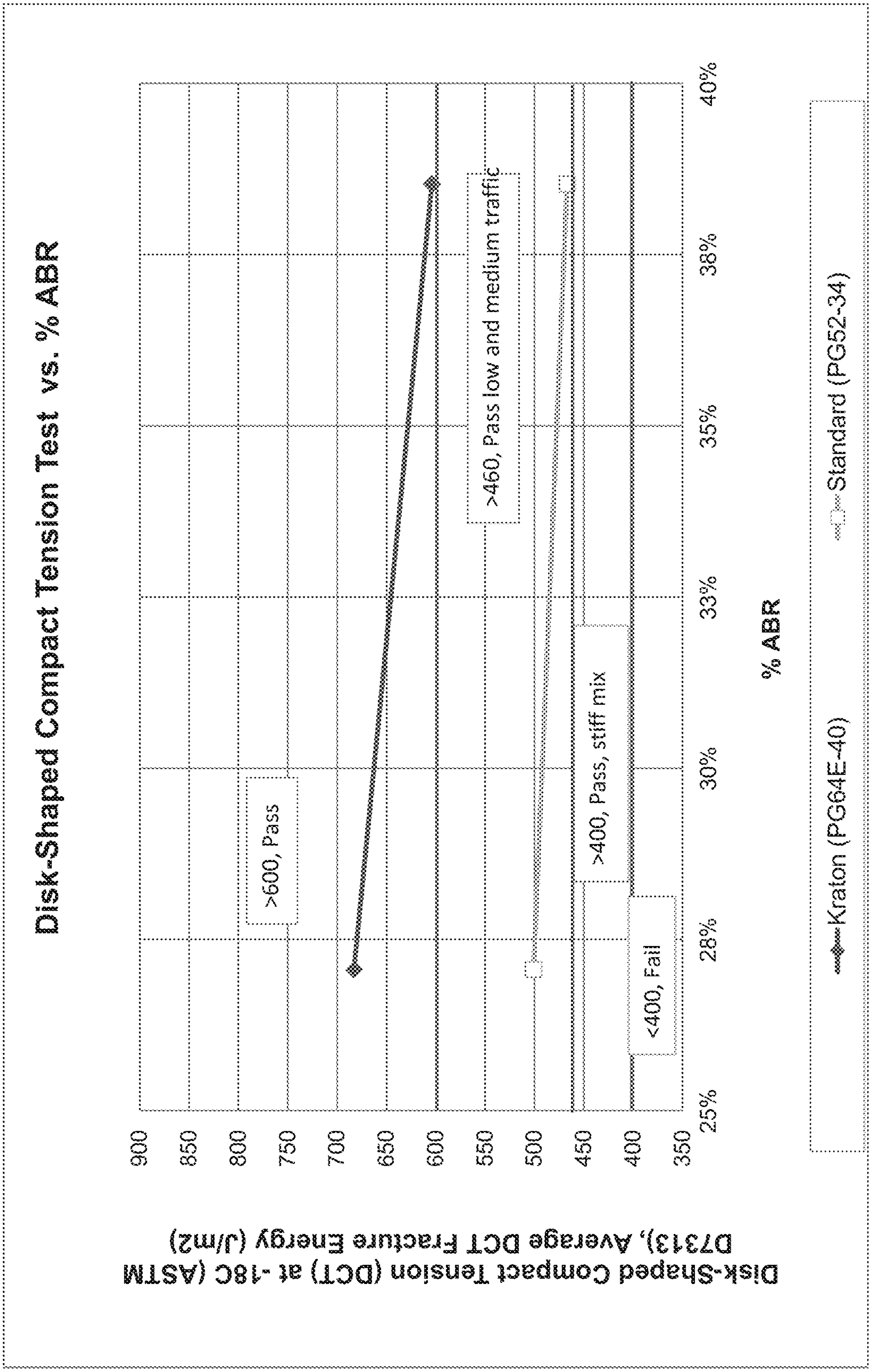
FIG. 4 is a plot of the results of a disk shaped compaction test carried out on the samples of example 1.

Disk-Shaped Compact Tension Test, FIG. 4, quantifies asphalt mixture's susceptibility to low temperature cracking. Relatively high fracture energy values indicate low susceptibility to thermal cracking. KRATON mixes were shown to have very good low temperature cracking performance as compared to standard PG52-34 mixes.

Figure 5:
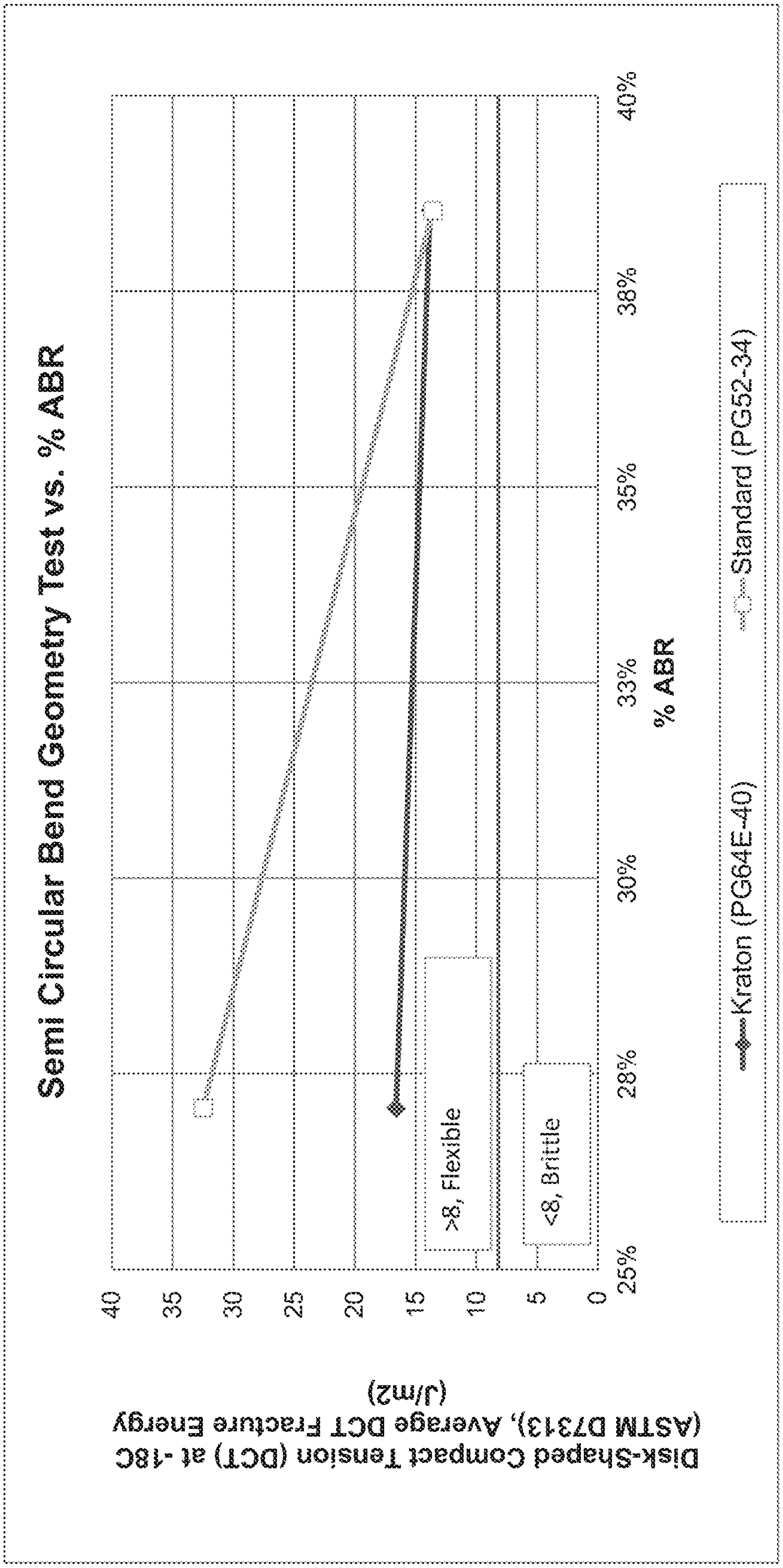
FIG. 5 is a plot of the results of a semicircular bond geometry test carried out on the samples of example 1.

Semi-Circular Bend Geometry Test, FIG. 5, quantifies mixture's intermediate temperature fracture resistance. High flexibility index values, especially above 8 indicate mixes, which are flexible. KRATON mixtures exhibit much better flexibility than standard (PG52-34) mixes especially at higher % ABR.

Based on the presented data the optimal ABR for the KRATON PG64-40 mix is >28% due to rutting, but less than 38% due to overlay cracking. Below is the breakdown:

Texas Overlay test (Cracking, intermediate temperature): <38% ABR

Hamburg Wheel tracking device (rutting, high temperature): >28% ABR

Disk-Shaped Compact Tension (low temperature cracking): acceptable throughout the range, but preferable <28% ABR Semi Circular Bend Geometry Test (Fracture test at intermediate temperature): <41% ABR.

As illustrated, KRATON (PG64E-40) mixes provide an advantage as compared to standard (PG52-34) mixes as evidenced by an overall better mixture performance results combining excellent fatigue, rutting and low temperature cracking performance. Achieving a balanced mix of performance is difficult for mixtures containing large amounts of RAP (>30%). The fact that a good balance of performance parameters combined with high % RAP was achieved for KRATON (PG64E-40) mixture is an evidence of its uniqueness and value.

TABLE 1

Mixture gradation and preparation details

| Sieve | 9.5 |
|---|---|
| Size (mm) | % Passing by weight |
| 19 | 100 |
| 12.5 | 100 |
| 9.5 | 98 |
| 4.75 | 83.7 |
| 2.36 | 58 |
| 1.18 | 42 |
| 0.6 | 27 |
| 0.3 | 15 |
| 0.15 | 9 |
| 0.075 | 6 |

TABLE 1-continued

| Mixture gradation and preparation details | |
|---|---|
| Binder Content (%) | 6.8 |
| KRATON (PG 64-40) Mixing Temp (° C.) | 171 |
| KRATON (PG 64-40) Compacting Temp (° C.) | 164 |
| Standard (PG 52-34) Mixing Temp (° C.) | 148 |
| Standard (PG 52-34) PG 52-34 Compacting Temp (° C.) | 125 |
| Binder Replacement Assuming 100% Contribution of RAP Binder (%) | 2.62 |
| Binder Replacement Assuming 70% Contribution of RAP Binder (%) | 1.84 |

The subject matter of the present disclosure having been generally described, the following examples are given as particular aspects of the disclosure and to demonstrate the practice and advantages thereof. It is understood that the examples are given by way of illustration and are not intended to limit the specification or the claims to follow in any manner.

The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an aspect of the present disclosure whether or not the statement is explicitly recited.

While various aspects of the present disclosures have been shown and described, modifications thereof can be made by one skilled in the art without departing from the spirit and teachings of the disclosure. The aspects of the present disclosures described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure of the present disclosure. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

What is claimed is:

1. A method of forming a paving composition comprising:

providing a rejuvenated asphalt binder consisting essentially of bitumen, a block copolymer composition and a bio-oil, wherein the rejuvenated asphalt binder has a rotational viscosity at 135° C. of equal to or less than 1000 centipoise, an original G*/sin δ at 64° C. of equal to or greater than 1 kPa where G* is the complex shear modulus and δ is the phase angle; and after aging in a Rolling Thin Film Oven (RTFO) a G*/sin δ at 64° C. of equal to or greater than 2.2 kPa and % recovery at 3.2 kPa of equal to or greater than 80%;

providing a virgin asphalt;

heating the virgin asphalt to a temperature from 160° C. to 200° C.;

providing a reclaimed asphalt pavement (RAP) and/or a reclaimed asphalt shingle (RAS);

mixing the heated virgin asphalt, RAP, and the rejuvenated asphalt binder under conditions suitable for the formation of the paving composition.

2. The method of claim 1 further comprising:

providing a virgin aggregate and mixing the virgin aggregate with the heated virgin asphalt, RAP and/or RAS, and the rejuvenated asphalt binder under conditions suitable for the formation of the paving composition.

3. The method of claim 1 further comprising:

providing a crosslinking agent and contacting the crosslinking agent with the rejuvenated asphalt binder to produce a crosslinked polymer/bitumen.

4. The method of claim 1 further comprising:

providing a crosslinking agent;

contacting the crosslinking agent with the rejuvenated asphalt binder forming a crosslinked bitumen/copolymer composition prior to mixing the rejuvenated asphalt binder with the virgin aggregate, the heated virgin asphalt, and RAP and/or RAS.

5. The method of claim 1, wherein providing a rejuvenated asphalt binder comprises:

combining a mixture of bitumen and bio-oil forming a first mixture;

adding a block copolymer to the first mixture at a weight ratio of block copolymer to bio-oil ranging from 1:7 to 3:1 to form the rejuvenated asphalt binder.

6. The method of claim 1, wherein providing a rejuvenated asphalt binder comprises:

combining a mixture of bitumen, bio-oil, and block copolymer at a weight ratio of block copolymer to bio-oil ranging from 1:7 to 3:1 to form the rejuvenated asphalt binder.

7. The method of claim 1, wherein providing a rejuvenated asphalt binder comprises:

combining a mixture of bitumen, bio-oil, and block copolymer, wherein the bio-oil is present in an amount of 6 wt. % to 13.25 wt. % based on the total weight of the rejuvenated asphalt binder.

8. The method of claim 1, wherein providing a rejuvenated asphalt binder comprises:

combining a mixture of bitumen, bio-oil, and block copolymer, wherein the bio-oil is present in an amount from 5 to 20 wt. % based on a combined amount of bio-oil and bitumen.

9. The method of claim 1, wherein the block copolymer composition comprises:

a) a diblock copolymer comprising one block of a monoalkenyl arene and one block of a conjugated diene, wherein the diblock copolymer has a peak molecular weight from 30,000 g/mol to 78,000 g/mol and a vinyl content from 35 to 80 mol percent, based on the number of repeat monomer units in the conjugated diene block; and b) a block copolymer comprising at least two blocks of monoalkenyl arene and at least one block of a conjugated diene, wherein the block copolymers b) comprises (i) linear triblock copolymers having a peak molecular weight that is from 1.5 to 3.0 times the peak molecular weight of the diblock copolymer (a), and a vinyl content from 35 to 80 mol percent based on the number of repeat monomer units in the conjugated diene blocks;

(ii) multiarm coupled block copolymers having a peak molecular weight that is 1.5 to 9.0 times the peak molecular weight of the diblock copolymer (a), and a vinyl content from 35 to 80 mol percent based on the number of repeat monomer units in the conjugated diene blocks;

or mixtures thereof, and wherein the ratio of (i) to (ii) is greater than 1:1.

10. The method of claim 1, wherein the bio-oil comprises principally functionalities derived from carboxylic acids including resin acids or $C_8$-$C_{20}$ fatty acids and $C_1$-$C_{18}$ alcohols.

11. The method of claim 1, wherein the % recovery at 3.2 kPa of equal to or greater than 90%.

12. A rejuvenated asphalt binder for use in forming a paving composition containing a reclaimed asphalt pavement (RAP) and/or a reclaimed asphalt shingle (RAS), wherein the binder consists essentially of a mixture of bitumen, bio-oil, and a block copolymer at a weight ratio of block copolymer to bio-oil ranging from 1:7 to 3:1, wherein the block copolymer comprises a) a diblock copolymer comprising one block of a monoalkenyl arene and one block of a conjugated diene; and b) one or more block copolymers comprising at least two blocks of monoalkenyl arene and at least one block of conjugated diene;

and wherein the rejuvenated asphalt binder has a rotational viscosity at 135° C. of equal to or less than 1000 centipoise, an original G*/sin δ at 64° C. of equal to or greater than 1 kPa, where G* is the complex shear modulus and δ is the phase angle, and a G*/sin δ at 64° C. of equal to or greater than 2.2 kPa after aging in a Rolling Thin Film Oven (RTFO), and % recovery at 3.2 kPa of equal to or greater than 80%.

13. The rejuvenated asphalt binder of claim 12, wherein the % recovery at 3.2 kPa of equal to or greater than 90%.

14. The rejuvenated asphalt binder of claim 12, wherein the bio-oil comprises principally functionalities derived from carboxylic acids including resin acids or $C_8$-$C_{20}$ fatty acids and $C_1$-$C_{18}$ alcohols.

15. The rejuvenated asphalt binder of claim 12, wherein the diblock copolymer has a peak molecular weight from 30,000 g/mol to 78,000 g/mol, and a vinyl content from 35 to 80 mol percent based on the number of repeat monomer units in the conjugated diene block; and the one or more block copolymers component b) comprises (i) linear triblock copolymers having a peak molecular weight that is from 1.5 to 3.0 times the peak molecular weight of the diblock copolymer (a) and a vinyl content from 35 to 80 mol percent based on the number of repeat monomer units in the conjugated diene block, (ii) multiarm coupled block copolymers having a peak molecular weight that is 1.5 to 9.0 times the peak molecular weight of the diblock copolymer (a) and a vinyl content from 35 to 80 mol percent based on the number of repeat monomer units in the conjugated diene block, or mixtures thereof, and wherein the ratio of (i) to (ii) is greater than 1:1.

16. The rejuvenated asphalt binder of claim 12, wherein the rejuvenated asphalt binder is for use in a paving composition.

17. The rejuvenated asphalt binder of claim 12, wherein the rejuvenated asphalt binder is for use in a paving composition which comprises from 30 to 65 wt. % based on the total weight of the paving composition, of a reclaimed asphalt pavement (RAP) and/or a reclaimed asphalt shingle (RAS).

18. The rejuvenated asphalt binder of claim 12, wherein the rejuvenated asphalt binder is for use in a paving composition which comprises from 35-60 wt. % based on the total weight of the paving composition, of a virgin aggregate.

19. The rejuvenated asphalt binder of claim 12, wherein the rejuvenated asphalt is cross-linked with a crosslinking agent forming a crosslinked bitumen/copolymer composition.

20. The rejuvenated asphalt binder of claim 19, wherein the crosslinked rejuvenated bitumen/copolymer composition is emulsified forming a bitumen emulsion containing from 50 wt. % to 75 wt. % of a dispersed phase containing bitumen.

* * * * *